US007580850B2

(12) United States Patent  (10) Patent No.: US 7,580,850 B2
Lurie  (45) Date of Patent: Aug. 25, 2009

(54) APPARATUS AND METHOD FOR ONLINE ADVICE CUSTOMER RELATIONSHIP MANAGEMENT

(75) Inventor: Steven Lurie, San Francisco, CA (US)

(73) Assignee: UTBK, Inc., Dover, DE (US)

(*) Notice: Subject to any disclaimer, the term of this patent is extended or adjusted under 35 U.S.C. 154(b) by 1086 days.

(21) Appl. No.: 10/021,877

(22) Filed: Dec. 14, 2001

(65) Prior Publication Data
US 2003/0115089 A1  Jun. 19, 2003

(51) Int. Cl.
*G06F 9/46* (2006.01)
(52) U.S. Cl. .............................. 705/9; 705/8
(58) Field of Classification Search .................. 705/8, 705/9
See application file for complete search history.

(56) References Cited

U.S. PATENT DOCUMENTS

| | | | |
|---|---|---|---|
| 4,313,035 | A | 1/1982 | Jordan et al. |
| 4,577,065 | A | 3/1986 | Frey et al. |
| 4,631,428 | A | 12/1986 | Grimes |
| 4,645,873 | A | 2/1987 | Chomet |
| 4,677,434 | A | 6/1987 | Fascenda |
| 4,723,283 | A | 2/1988 | Nagasawa et al. |
| 4,741,025 | A | 4/1988 | Maruyama et al. |
| 4,751,669 | A | 6/1988 | Sturgis et al. |
| 4,752,675 | A | 6/1988 | Zetmeir |
| 4,796,293 | A | 1/1989 | Blinken et al. |
| 4,847,890 | A | 7/1989 | Solomon et al. |
| 4,878,239 | A | 10/1989 | Solomon et al. |
| 4,969,185 | A | 11/1990 | Dorst et al. |
| 5,018,917 | A | 5/1991 | Colby |
| 5,058,152 | A | 10/1991 | Solomon et al. |
| 5,099,510 | A | 3/1992 | Blinken, Jr. et al. |
| 5,148,474 | A | 9/1992 | Haralambopoulos et al. |
| 5,155,743 | A | 10/1992 | Jacobs |

(Continued)

FOREIGN PATENT DOCUMENTS

AU  699785  5/1995

(Continued)

OTHER PUBLICATIONS

U.S. Appl. No. 09/596,466, filed Jun. 19, 2000, Agdeppa, Hector A.

(Continued)

*Primary Examiner*—Romain Jeanty
(74) *Attorney, Agent, or Firm*—John P. Ward; Greenberg Traurig, LLP

(57) ABSTRACT

An apparatus and method for online advice customer relationship management are described. The method includes the determination of a service provider ID code from a requesting service provider. Once a service provider ID code is determined, a list of service seekers that have received advice regarding a field of service from a service provider corresponding to the service provider ID code is generated. Once generated, the listing of service seekers is displayed via a customer management screen. As such, system administrators, as well as the service providers themselves, may view listings of service seekers in order to provide relationship management of the service seekers, such as for example, providing incentives to service seekers for follow-up advice, as well as blocking undesired service seekers from further contact with the service provider.

27 Claims, 17 Drawing Sheets

U.S. PATENT DOCUMENTS

| | | |
|---|---|---|
| 5,155,761 A | 10/1992 | Hammond |
| 5,206,903 A | 4/1993 | Kohler et al. |
| 5,319,542 A | 6/1994 | King, Jr. et al. |
| 5,325,424 A | 6/1994 | Grube |
| 5,339,358 A | 8/1994 | Danish et al. |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,373,549 A | 12/1994 | Bales et al. |
| 5,436,957 A | 7/1995 | McConnell |
| 5,448,625 A | 9/1995 | Lederman |
| 5,453,352 A | 9/1995 | Tachibana |
| 5,459,779 A | 10/1995 | Backaus et al. |
| 5,469,497 A | 11/1995 | Pierce et al. |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,604,803 A | 2/1997 | Aziz |
| 5,608,786 A | 3/1997 | Gordon |
| 5,615,213 A | 3/1997 | Griefer |
| 5,619,148 A | 4/1997 | Guo |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,623,536 A | 4/1997 | Solomon et al. |
| 5,634,012 A | 5/1997 | Stefik et al. |
| 5,638,432 A | 6/1997 | Wille et al. |
| 5,644,715 A | 7/1997 | Baugher |
| 5,651,058 A | 7/1997 | Hackett-Jones et al. |
| 5,668,953 A | 9/1997 | Sloo |
| 5,675,734 A | 10/1997 | Hair |
| 5,689,553 A | 11/1997 | Ahuja et al. |
| 5,694,163 A | 12/1997 | Harrison |
| 5,694,537 A | 12/1997 | Montenegro et al. |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,794,210 A | 8/1998 | Goldhaber et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,841,763 A | 11/1998 | Leondires et al. |
| 5,842,212 A | 11/1998 | Ballurio et al. |
| 5,845,265 A | 12/1998 | Woolston |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Andrews et al. |
| 5,884,032 A * | 3/1999 | Bateman et al. ............ 709/204 |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,903,877 A * | 5/1999 | Berkowitz et al. ............ 705/26 |
| 5,907,677 A | 5/1999 | Glenn et al. |
| 5,911,132 A | 6/1999 | Sloane |
| 5,914,951 A | 6/1999 | Bentley et al. |
| 5,915,214 A | 6/1999 | Reece et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,943,422 A | 8/1999 | Van Wie et al. |
| 5,946,646 A | 8/1999 | Schena et al. |
| 5,948,054 A | 9/1999 | Nielsen |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,439 A | 1/2000 | Walker et al. |
| 6,014,644 A | 1/2000 | Erickson |
| 6,016,478 A | 1/2000 | Zhang et al. |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A * | 2/2000 | Bezos et al. .................. 705/27 |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,067,561 A | 5/2000 | Dillon |
| 6,078,866 A | 6/2000 | Buck et al. |
| 6,108,493 A | 8/2000 | Miller et al. |
| 6,130,933 A | 10/2000 | Miloslavsky |
| 6,131,085 A | 10/2000 | Rossides |

| | | |
|---|---|---|
| 6,144,670 A | 11/2000 | Sponaugle et al. |
| 6,167,379 A | 12/2000 | Dean et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,185,289 B1 | 2/2001 | Hetz et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,212,268 B1 | 4/2001 | Nielsen |
| 6,216,111 B1 | 4/2001 | Walker et al. |
| 6,223,165 B1 * | 4/2001 | Lauffer .............. 705/8 |
| 6,230,287 B1 | 5/2001 | Pinard et al. |
| 6,233,566 B1 | 5/2001 | Levine et al. |
| 6,243,684 B1 | 6/2001 | Stuart et al. |
| 6,246,875 B1 | 6/2001 | Seazholtz et al. |
| 6,248,946 B1 | 6/2001 | Dwek |
| 6,259,774 B1 | 7/2001 | Miloslavsky |
| 6,266,651 B1 | 7/2001 | Wooston |
| 6,269,336 B1 | 7/2001 | Ladd et al. |
| 6,269,361 B1 | 7/2001 | Davis et al. |
| 6,282,515 B1 | 8/2001 | Speicher |
| 6,292,799 B1 | 9/2001 | Peek et al. |
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |
| 6,310,941 B1 | 10/2001 | Crutcher et al. |
| 6,311,231 B1 | 10/2001 | Bateman et al. |
| 6,314,402 B1 | 11/2001 | Monaco et al. |
| 6,314,454 B1 | 11/2001 | Wang et al. |
| 6,323,894 B1 | 11/2001 | Katz |
| 6,353,663 B1 | 3/2002 | Stevens et al. |
| 6,381,325 B1 | 4/2002 | Hanson |
| 6,385,583 B1 | 5/2002 | Ladd et al. |
| 6,389,278 B1 | 5/2002 | Singh |
| 6,389,541 B1 | 5/2002 | Patterson |
| 6,393,117 B1 | 5/2002 | Trell |
| 6,393,412 B1 | 5/2002 | Deep |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,430,276 B1 | 8/2002 | Bouvier et al. |
| 6,434,527 B1 | 8/2002 | Horvitz |
| 6,461,162 B1 | 10/2002 | Reitman et al. |
| 6,463,136 B1 | 10/2002 | Malik |
| 6,470,079 B1 | 10/2002 | Benson |
| 6,470,317 B1 | 10/2002 | Ladd et al. |
| 6,470,338 B1 | 10/2002 | Rizzo et al. |
| 6,477,246 B1 * | 11/2002 | Dolan et al. .......... 379/211.02 |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,504,920 B1 | 1/2003 | Okon et al. |
| 6,510,417 B1 | 1/2003 | Woods et al. |
| 6,513,013 B1 | 1/2003 | Stephanou |
| 6,519,570 B1 | 2/2003 | Faber et al. |
| 6,523,010 B2 | 2/2003 | Lauffer |
| 6,529,878 B2 | 3/2003 | De Rafael et al. |
| 6,539,359 B1 | 3/2003 | Ladd et al. |
| 6,542,732 B1 | 4/2003 | Khazaka et al. |
| 6,546,372 B2 | 4/2003 | Lauffer |
| 6,549,889 B2 | 4/2003 | Lauffer |
| 6,560,576 B1 | 5/2003 | Cohen et al. |
| 6,563,915 B1 | 5/2003 | Salimando |
| 6,606,376 B1 | 8/2003 | Trell |
| 6,609,106 B1 * | 8/2003 | Robertson .............. 705/26 |
| 6,611,501 B1 | 8/2003 | Owen et al. |
| 6,625,595 B1 | 9/2003 | Anderson et al. |
| 6,636,590 B1 | 10/2003 | Jacob et al. |
| 6,658,389 B1 | 12/2003 | Alpdemir |
| 6,668,286 B2 | 12/2003 | Bateman et al. |
| 6,691,093 B2 | 2/2004 | Shell |
| 6,704,403 B2 | 3/2004 | Lurie et al. |
| 6,731,625 B1 | 5/2004 | Eastep et al. |
| 6,732,183 B1 | 5/2004 | Graham |
| 6,741,691 B1 | 5/2004 | Ritter et al. |
| 6,757,364 B2 | 6/2004 | Newkirk |
| 6,771,760 B1 | 8/2004 | Vortman et al. |
| 6,775,359 B1 | 8/2004 | Ron et al. |
| 6,798,753 B1 * | 9/2004 | Doganata et al. .......... 370/260 |
| 6,801,899 B2 | 10/2004 | Lauffer |
| 6,807,532 B1 | 10/2004 | Kolls |
| 6,807,571 B2 | 10/2004 | Hatano et al. |
| 6,836,225 B2 | 12/2004 | Lee et al. |
| 6,839,737 B1 | 1/2005 | Friskel |
| 6,865,540 B1 | 3/2005 | Faber et al. |
| 6,898,435 B2 | 5/2005 | Milman |
| 6,910,159 B2 | 6/2005 | Phillips et al. |
| 6,968,174 B1 | 11/2005 | Trandal et al. |
| 6,990,183 B2 | 1/2006 | Holland et al. |
| 7,031,697 B2 | 4/2006 | Yang et al. |
| 7,032,030 B1 | 4/2006 | Condignotto |
| 7,046,782 B2 | 5/2006 | Miller |
| 7,103,010 B2 | 9/2006 | Melideo |
| 7,212,615 B2 | 5/2007 | Wolmuth |
| 2001/0012357 A1 | 8/2001 | Mirashrafi et al. |
| 2001/0025274 A1 | 9/2001 | Zehr et al. |
| 2001/0026609 A1 | 10/2001 | Weinstein et al. |
| 2001/0027481 A1 * | 10/2001 | Whyel .............. 709/218 |
| 2001/0029482 A1 | 10/2001 | Tealdi et al. |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0044751 A1 * | 11/2001 | Pugliese et al. .......... 705/26 |
| 2001/0048737 A1 | 12/2001 | Goldberg et al. |
| 2002/0003867 A1 | 1/2002 | Rothschild et al. |
| 2002/0010608 A1 * | 1/2002 | Faber et al. .............. 705/8 |
| 2002/0010616 A1 | 1/2002 | Itzhaki |
| 2002/0024948 A1 | 2/2002 | Pendse |
| 2002/0029241 A1 | 3/2002 | Yokono et al. |
| 2002/0038233 A1 | 3/2002 | Shubov et al. |
| 2002/0038293 A1 | 3/2002 | Seiden |
| 2002/0042826 A1 | 4/2002 | Gaus et al. |
| 2002/0059082 A1 | 5/2002 | Moczygemba |
| 2002/0065959 A1 | 5/2002 | Kim et al. |
| 2002/0069105 A1 | 6/2002 | do Rosario Botelho et al. |
| 2002/0071423 A1 | 6/2002 | Mirashrafi et al. |
| 2002/0071426 A1 | 6/2002 | Karamchedu et al. |
| 2002/0072974 A1 * | 6/2002 | Pugliese et al. .............. 705/14 |
| 2002/0073207 A1 | 6/2002 | Widger et al. |
| 2002/0087565 A1 | 7/2002 | Hoekman et al. |
| 2002/0091607 A1 | 7/2002 | Sloan et al. |
| 2002/0094074 A1 | 7/2002 | Lurie |
| 2002/0095331 A1 | 7/2002 | Osmar et al. |
| 2002/0095359 A1 | 7/2002 | Mangetsu |
| 2002/0107697 A1 | 8/2002 | Jensen |
| 2002/0112005 A1 | 8/2002 | Namias |
| 2002/0116266 A1 | 8/2002 | Marshall |
| 2002/0120554 A1 | 8/2002 | Vega |
| 2002/0128891 A1 * | 9/2002 | McSherry .............. 705/8 |
| 2002/0133402 A1 | 9/2002 | Faber et al. |
| 2002/0133570 A1 | 9/2002 | Jacob et al. |
| 2002/0133571 A1 | 9/2002 | Jacob et al. |
| 2002/0169836 A1 * | 11/2002 | Hood et al. .............. 709/206 |
| 2002/0191762 A1 | 12/2002 | Benson |
| 2002/0193094 A1 | 12/2002 | Lawless et al. |
| 2002/0193135 A1 | 12/2002 | Nakano |
| 2003/0005126 A1 * | 1/2003 | Schwartz et al. .......... 709/227 |
| 2003/0041255 A1 | 2/2003 | Chen et al. |

| | | | |
|---|---|---|---|
| 2003/0043981 A1 | 3/2003 | Lurie et al. | |
| 2003/0046161 A1 | 3/2003 | Kamanger et al. | |
| 2003/0061094 A1* | 3/2003 | Banerjee et al. | 705/14 |
| 2003/0112944 A1 | 6/2003 | Brown et al. | |
| 2003/0126205 A1 | 7/2003 | Lurie | |
| 2003/0140084 A1 | 7/2003 | D'Angelo | |
| 2003/0220866 A1 | 11/2003 | Pisaris-Henderson | |
| 2003/0223565 A1 | 12/2003 | Montemer | |
| 2003/0225682 A1 | 12/2003 | Montemer | |
| 2004/0006511 A1 | 1/2004 | Montemer | |
| 2004/0010518 A1 | 1/2004 | Montemer | |
| 2004/0023644 A1 | 2/2004 | Montemer | |
| 2004/0038673 A1 | 2/2004 | Dunn et al. | |
| 2004/0066927 A1 | 4/2004 | Horvath et al. | |
| 2004/0083133 A1 | 4/2004 | Nicholas et al. | |
| 2004/0096110 A1 | 5/2004 | Yogeshwar et al. | |
| 2004/0100497 A1 | 5/2004 | Quillen et al. | |
| 2004/0162757 A1 | 8/2004 | Pisaris-Henderson | |
| 2004/0196833 A1 | 10/2004 | Dahan et al. | |
| 2004/0204997 A1 | 10/2004 | Blaser et al. | |
| 2004/0234049 A1 | 11/2004 | Melideo | |
| 2004/0234064 A1 | 11/2004 | Melideo | |
| 2004/0236441 A1 | 11/2004 | Melideo | |
| 2004/0252820 A1 | 12/2004 | Faber et al. | |
| 2004/0254859 A1 | 12/2004 | Aslanian, Jr. | |
| 2004/0258048 A1 | 12/2004 | Melideo | |
| 2004/0260413 A1 | 12/2004 | Melideo | |
| 2005/0010795 A1 | 1/2005 | Tagawa et al. | |
| 2005/0021744 A1 | 1/2005 | Haitsuka et al. | |
| 2005/0044238 A1* | 2/2005 | Jacob et al. | 709/227 |
| 2005/0048961 A1 | 3/2005 | Ribaudo et al. | |
| 2005/0065811 A1 | 3/2005 | Chu et al. | |
| 2005/0071509 A1 | 3/2005 | Faber et al. | |
| 2005/0080878 A1 | 4/2005 | Cunningham et al. | |
| 2005/0086104 A1 | 4/2005 | McFadden | |
| 2005/0114210 A1 | 5/2005 | Faber et al. | |
| 2005/0220289 A1 | 5/2005 | Reding | |
| 2005/0119957 A1 | 6/2005 | Faber et al. | |
| 2005/0165666 A1 | 7/2005 | Wong et al. | |
| 2005/0203799 A1 | 9/2005 | Faber et al. | |
| 2005/0209874 A1 | 9/2005 | Rossini | |
| 2005/0216341 A1 | 9/2005 | Agarwal et al. | |
| 2005/0216345 A1 | 9/2005 | Altberg et al. | |
| 2005/0222908 A1 | 10/2005 | Altberg et al. | |
| 2005/0251445 A1 | 11/2005 | Wong et al. | |
| 2006/0031516 A1 | 2/2006 | Kumer | |
| 2006/0095343 A1 | 5/2006 | Clark et al. | |
| 2006/0184378 A1 | 8/2006 | Agarwal et al. | |
| 2006/0215826 A1 | 9/2006 | Lurie et al. | |

FOREIGN PATENT DOCUMENTS

| | | |
|---|---|---|
| EP | 04253389.3 | 9/2004 |
| EP | 1489529 | 12/2004 |
| GB | 2329046 A | 10/1999 |
| JP | 409233441 A | 9/1997 |
| JP | 409319812 A | 12/1997 |
| JP | 2002007887 | 1/2002 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 0057326 | 9/2000 |
| WO | WO 00/73960 | 12/2000 |
| WO | WO 01/01217 | 1/2001 |
| WO | 0120518 | 3/2001 |
| WO | 0127825 | 4/2001 |
| WO | WO 01/28141 | 4/2001 |
| WO | WO0127825 A1 * | 4/2001 |
| WO | WO 01/44973 | 6/2001 |
| WO | 0184415 | 11/2001 |
| WO | 0213110 | 2/2002 |
| WO | 0237470 | 5/2002 |
| WO | WO 02/44870 | 6/2002 |
| WO | 2005109287 | 11/2005 |

OTHER PUBLICATIONS

U.S. Appl. No. 60/198,642, filed Apr. 20, 2000, Rothschild et al.
U.S. Appl. No. 60/471,535, filed May 19, 2003, Melideo.
Big Green Blog: Jan. 2005 Archives, Feb. 21, 2006.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
Information about Expertcity.com retrieved from the Internet [http://www.expertcity.com] on Nov. 6, 2000.
Ingenio Press Archives for 2004, www.ingenio.com, Feb. 21, 2006.
"Introducing 1-800-FREE411: First Nationwide Free Telephone Directory Assistance Service" Jingle Networks, Inc., Huntington Beach, Calif., Sep. 20, 2005.
"Jambo Launches to Connect People and businesses From the Internet to the Phone", Agoura Hills, Calif. May 3, 2005.
"Jambo Names Netzero Co-founder Stacy Haitsuka to New Post of Chief Information Officer", Agoura Hills, Calif., Jul. 5, 2005.
"Jambo Receives $5 Million in Financiing from Kline Hawkes & Co., Westlake Venture Partners, Others", Agoura Hills, Calif., Oct. 17, 2005.
*Keen.com, Inc.* v. *InfoRocket.com, Inc.*, Complaint for Patent Infringement, Trade Dress Infringement and Unfair Competition; Demand for Jury Trial filed Aug. 31, 2001, pp. 1-8 plus 17 pgs. of attachments.
*Keen.com, Inc.* v. *InfoRocket.com, Inc.*, Preliminary Injunction Hearing, pp. 286-289 (Jan. 8, 2002).
Keen.com Feb. 4, 2006.
Keen.com Plans Web Service Allowing Customers to Hold Private Phone Chats, Don Clark, Wall Street Journal, Nov. 8, 1999.
Keen.com raises $60 Million from Prestigious . . . , Business Wire, Jan. 11, 2000.
"Lucent Technology and Netscape Team to Deliver Lucent Ecommerce Solutions," Business Wire, Sep. 1998.
"Netcall Internet Call Buttons Enhance E-Commerce Customer Service and Sales", PR Newswire, p. 7431., Aug. 1999.
PCT Search Report for PCT Application No. PCT/US01/48284, filed Oct. 30, 2001 (corresponding to U.S. Appl. No. 09/702,217) mailed May 13, 2002 (7 pgs.).
Sell and buy advice online, The Ottawa Citizen, Nov. 29, 1999.
"UpSnap Selects LookSmart to Sell Premium Listings on Free 411 Service for Text-Enabled Cell Phones", Novem.
"Welcome to Jambo—the leader in Pay-per-Call Solutions" (search results) Oct. 17, 2005.
Ads-Click, "Ads-click Adds Skype-Based Pay-Per-Call Advertising Capabilities to Its Private-Labeled Solution, which will be Unveiled at ad:tech New York," Market Wire, Oct. 10, 2005.
ISA/US, International Search Report for International Application No. PCT/US05/12061, 3 pages, Nov. 17, 2006.
Jingle Networks, Inc., "1-800-FREE411 Provides Two Great Opportunities to Acquire New Customers," available at least by Oct. 20, 2005.
Melideo, John, U.S. Appl. No. 60/471,535 entitled "HyperDial," filed May 19, 2003.
Alexander, Kelly King et al., "1-900 (Pay-For-Information Phone Services)," Baton Rouge Business Report, vol. 9, No. 20, pp. 23-27, Jul. 30, 1991.
Keen.com, "The Most Popular U.S. Question and Answer Marketplace Goes International 90 Days After Launch," PRNewswire, Mar. 13, 2000.
Kempner, Matt, "SWM Seeking—the Net Rather than Newspapers," Atlanta Journal the Atlanta Constitution, p. Q1, Sep. 10, 2000.
Turco, Franco, "Legislation is Planned to Hem in 'Scooplines' Covers Revealing Rates, Blocking Service," Arizona Republic, Final Edition, Valley & State Section, p. B8, Jan. 16, 1988.
The Voice of Technology, Credit World, pp. 20-23, Jul. 1994.
Telecommunications Buyers Guide and Directory, Editor & Publisher, pp. 29TC-38TC, Feb. 1994.

Aspect Telecomm: Aspect Integrates the Web into the Call Center, M2 Presswire, Aug. 1996.
Information, Bid and Asked, Forbes, Aug. 20, 1990, 92.
Attachmate Ready to Answer 'Net questions, Network World, Apr. 8, 1996, 37.
US Courts to Launch First Federal 900 Service, Federal Computer Week, Sep. 28, 1992, 8.
Company Devoted to Hot-Line Support, Computer Reseller News, Oct. 21, 1991, 48.
For Telesphere's Clients, Dial '1-900 Tuf Luck',Business Week, Sep. 9, 1991, 88.
When Business Plan and real World Clash, Wall Street Journal, Jun. 9, 1999, B1.
Hidden Cost of Tech Support, PC World, May 1995, 143.
NetBazaar: Networked Electronic Markets for Trading Computation and Information Services, ECDL 1998—Research and Advanced Technology for Digital Libraries, 839.
Multimedia Collaborative Remote Consultation Tools via Gigabit WAN in Teleradiology, IEEE 1994 Phoenix, 417.
Multimedia Communication in a Medical Environment, IEEE 1991 Singapore I.C. on Networks, 166.
A New Teleconsultation Terminal System Using ISDN, NTT Review, Jul. 1991, 37.
MiniPay: Charging Per Click on the Web, CNISDN, 1997 v29, 939.
Caring for Customers: Real-time text chat and telephony provide personalized customer support and turn queries into sales leads, Internet World Media, Sep. 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Franco Mercalli and Roberto Negrini, "The ESSAI Teleshopping System: An Example of a Broadband Multimedia Application," Publication No. 0-7803-1820-X/94, IEEE, 1994, pp. 572-576.
Abhaya Asthana and Paul Krzyzanowski, "A Small Domain Communications System for Personalized Shopping Assistance," Proceedings of ICPWC'94, Publication No. 0-7803-1996-6/94, IEEE, 1994, pp. 199-203.
Linda Littleton, "Meet the Shadowy Future," Proceedings ACM SIGUCCS User Services Conference XXII, Ypsilanti, Michigan Oct. 16-19, 1994, pp. 205-210.
L. F. Ludwig and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8.4, pp. 283-291.
ISDN Tutorial:Definitions, http://www.ralphb.net/ISDN/defs.html , printed on Apr. 21, 2000.
ISDN Tutorial: Interfaces, http://www.ralphb.net/ISDN/ifaces.html , printed on Apr. 21, 2000.
"USA Global Link Brings Interactively to Internet Shopping", Business Wire., Oct. 1998.
"TriNet's Help Me, I'm Stuck, Internet Voice Button Services Pushes Web Pages to Online Users", Business Wire, Mar. 1998.
Tehrani, Rich, "e-Rip Van Winkle and the 60 second Nap", Call Center Solution, vol. 18, No. 2, pp. 16(3)., Aug. 1999.
"Connecting to On-Line Car Shoppers: Auto Sellers Use Netcall Internet Call -Button Technology to Turn Clicks into Interactive Sales", Business Wire, p. 4089., Jul. 1999.
Davey, Tom, "Wheeling and Dealing Online", PC Week, vol. 13, No. 45, pp. 1, 129., Nov. 1996.
Collett, Stacey & Julie King, "Why Online Browsers Don't Become Buyers", Computerworld, vol. 33, No. 48, p. 14.

Information about Expertcity.com retrieved from the Internet [URL: http://www.expertcity.com] on Apr. 9, 2000.
"Rent-An Expert On the Web", Information Week, p. 75, Sep. 1999.
"Expercity.com Launches Premier Online Marketplace for Expert Services", PR Newswire, Aug. 1999.
Information about keen.com retrieved form the Internet [URL: http//www.keen.com], on Oct. 24, 2000.
Cynthia Hodgson, "Online Expert Databases & Services", Econtent, Dec. 1999, p. 48-53.
Jeff Peline, "Net Firm to Connect Users by phone", CNET News. com, [retrieved from http://news.cnet.com on Oct. 24, 2001.
"Keen.Com Launches First Live Answer Community", Press release retrieved from http://www.keen.com on Oct. 24, 2000.
John Healey, "From A-Z, You Can Sell Advice Online", Mercury News [retrieved from http://wwwO.mercurycenter.com on Oct. 24, 2001.
Joseph Menn, "An Expert? There's Now a Home for You on the Internet", Los Angeles Times [retrieved from http://www.denverpost.com on Oct. 24, 2001.
"Walker Digital Issued Landmark U.S Patent No. 5,862,223 for Global Internet Marketplace for Experts", Business Wire, Jan. 26, 1999.
Qcircuit Web Site (www.qcircuit.com).
Infomarkets.com Web Site (www.infomarkets.com).
Intellect Exchange Web Site (www.intellectexchange.com).
Answers.com Web Page (www.answers.com).
Chris Ott, "Making Good on the Information Economy", Denver Business Journal, Dec. 17, 1999, p. 27.
Michael Rogers et al, "Experts abound at New Web Sites", Library Journal, Mar. 1, 2000, pp. 22-24.
"Surfbrains.com: Brains online save time & money", M2 Presswire, Jul. 11, 2000.
Michael Kanellos, "Do You Want To Know The Meaning of Life?", Computer Reseller News, Mar. 3, 1997, pp. 72-74.
"Applying Technology News", Acccounting Technology, Feb./Mar. 1997, p. 14.
Ellen Greenblatt,"Have you ever wondered . . . ", Datamation, Oct. 1997, p. 126.
"Information for sale: Commercial Digital Reference and AskA Services", Virtual Reference Desk, Sep. 20, 1999, at www.vrd.org/AskA/commAskA.html.
EXP.com Web Site at www.exp.com/.
The Web Site at www.experts-exchange,com/.
Electronic Emissary at www.tapr.org/emissary/.
The Web Site at www.allexperts.com/.
ADS-Click, "ADS-click Adds Skype-Based Pay-Per-Call Advertising Capabilities to Its Private-Labeled Solution, which will be Unveiled at ad:tech New York," Market Wire, Oct. 10, 2005.
ISA/US, International Search Report for International Application No. PCT/US05/12061, 3 pages, Nov. 17, 2006.
Jingle Networks, Inc., "1-800-FREE411 Provides Two Great Opportunities to Acquire New Customers," available at least by Oct. 20, 2005.
Melideo, John, U.S. Appl. No. 60/471,535 entitled "HyperDial," filed May 19, 2003.
Alexander, Kelly King et al., "1-900 (Pay-For-Information Phone Services)," Baton Rouge Business Report, vol. 9, No. 20, pp. 23-27, Jul. 30, 1991.
Keen.Com, "The Most Popular U.S. Question and Answer Marketplace Goes International 90 Days After Launch," PR Newswire, Mar. 13, 2000.
Kempner, Matt, "SWM Seeking - the Net Rather than Newspapers," Atlanta Journal the Atlanta Constitution, p. Q1, Sep. 10, 2000.
Turco, Franco, "Legislation is Planned to Hem in 'Scooplines' Covers Revealing Rates, Blocking Service," Arizona Republic, Final Edition, Valley & State Section, p. B8, Jan. 16, 1988.

* cited by examiner

My Keen > My Customers

My Customers

Main View | Customer Lists ⎯504

Manage your relationships with your customers by sending Keen Mail correspondence to them, writing notes to yourself about conversations you've had, or organizing them into customer lists. Below, you can see who called you when, what type of correspondence you had and how much the customer spent with you. Learn more about My Customers

[ Compose E-Mail ] [ Block ] [ Assign to List ]

| ☐ | △ | Customer | 📞 | 🎧 | ✉ | Last Contact Date ▽ | Total Earnings | Customer Type |
|---|---|---|---|---|---|---|---|---|
| ☐ | | Brian Firebrand | 0 | 0 | 0 | 11/07/2001 | $0.00 | New Customers |
| ☐ | | Lady Capper | 0 | 0 | 3 | 11/07/2001 | $0.00 | New Customers |
| ☐ | | Member 831675 | 0 | 0 | 3 | 11/06/2001 | $3.00 | Unassigned |
| ☐ | | ebbe | 2 | 2 | 6 | 11/06/2001 | $20.00 | Unassigned |
| ☐ | △ | scott | 1 | 0 | 3 | 11/06/2001 | $30.00 | New Customers |
| ☐ | | Sarah Sunshine | 0 | 0 | 0 | 11/02/2001 | $1.00 | New Customers |
| ☐ | △ | daric | 0 | 0 | 2 | 10/31/2001 | $0.00 | New Customers |
| ☐ | | Rah Tiger | 2 | 0 | 0 | 10/31/2001 | $0.00 | New Customers |
| ☐ | | KenMCSE | 0 | 0 | 3 | 10/29/2001 | $9.00 | New Customers |
| ☐ | | like14141 | 1 | 0 | 1 | 10/18/2001 | $2.50 | New Customers |
| ☐ | | Shelly2641 | 0 | 0 | 0 | 10/18/2001 | $0.75 | New Customers |
| ☐ | △ | rhirson | 1 | 0 | 1 | 10/18/2001 | $1.80 | New Customers |
| ☐ | | TestStevenLurie | 1 | 1 | 1 | 10/10/2001 | $3.00 | Unassigned |
| ☐ | | saurabhmital | 0 | 0 | 1 | 10/03/2001 | $2.00 | New Customers |
| ☐ | △ | jerry2jusa98 | 0 | 0 | 0 | 10/01/2001 | $0.00 | New Customers |

CUSTOMER MANAGEMENT SCREEN 500

FIG. 3

My Keen > My Customers

My Customers

Main View | Customer Lists

Member Name: scott ~602
Alert: Urgent - Follow Up Now! ● ~604
☑ Send Keen Mail ~608
Send Invitation ~610

Customer Type: -unassigned- ▽   [Update] ~614
                        612

Member Since 11/08/00

Contact Summary 620

Total Amount Earned: $0.00 *    Average Feedback Given: ☆☆☆☆☆

| Type of Contact | Amt. Earned | # of Contacts | # of Minutes | Last Contact (in days) |
|---|---|---|---|---|
| Live Advice Calls: | $0.00 | 2 | 4 | 42 |
| Recorded Advice Calls: | -- | 0 | -- | -- |
| Keen Mail Sent: | -- | 3 | -- | 23 |
| Keen Mail Received: | -- | 1 | -- | 629 |

* calls only

Contacts ~630
        ~632                              634                              636

| ▽ Date | Type of Contact | Amount Earned |
|---|---|---|
| 11/06/2001 | Sent Keen Mail | $ N/A |
| 10/18/2001 | Live Advice Call | $0.00 |
| 10/18/2001 | Live Advice Call | $0.00 |
| 10/11/2001 | Received Keen Mail | $ N/A |
| 10/11/2001 | Sent 3 Free Minutes | $ N/A |

Notes ~640

CUSTOMER DETAIL SCREEN 600

FIG. 4

Contacts 630 632

| ▽ Date | Type of Contact 634 | NEXT  Amount Earned 636 |
|---|---|---|
| 11/06/2001 | Sent Keen Mail | $ N/A |
| 10/18/2001 | Live Advice Call | $0.00 |
| 10/18/2001 | Live Advice Call | $0.00 |
| 10/11/2001 | Received Keen Mail | $ N/A |
| 10/11/2001 | Sent 3 Free Minutes | $ N/A |
| | | NEXT |

Notes 640

Don't forget to click "Update" to save your changes. 652

| Update | Cancel |
|---|---|
| 660 | 662  664 |

Feedback 650

| ▽ Date | Rating | Feedback 670 |
|---|---|---|
| 03/13/2000 | ★★★★★ | Brilliant rundown of plays! |

CUSTOMER CONTACT SCREEN 630

FIG. 5

APPARATUS AND METHOD FOR ONLINE ADVICE CUSTOMER RELATIONSHIP MANAGEMENT

FIELD OF THE INVENTION

The invention relates generally to the field of customer relations management. More particularly, the invention relates to a method and apparatus for online advice customer relationship management.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider. Each 1-900 number, however, has a very narrow scope—"Hear your Horoscope," for instance. If a seeker would like to hear an entirely different service—"Your Local Weather," for instance—he/she would have to dial a completely different 1-900 number. Similarly, each 1-900 number is quite rigid in the price, quality, and specificity of its service.

However, current systems (service provider systems) now exist that enable seekers to locate service providers according to a wide range of price, quality and specificity of service (U.S. application Ser. No. 09/414,710 and U.S. application Ser. No. 09/702,217). Such systems also make it possible for the service provider and buyer to be connected and communicate in real time. Such systems, provide service seekers the capability to select service providers via the Internet, assuming the service seeker owns or has access to the necessary computer hardware to browse the internet. In addition, a service seeker can be matched to a wide array of service providers with specific skills using only a simple audio-transmission medium such as the telephone.

The systems described above, such as for example, the service provider systems, are designed to generate capital for both the owners of the systems, as well as the service providers, which provider their services via the systems. As such, the more requests and live conversations the service provider engages in, the more money the service providers will generate. Accordingly, the more money generated by the service providers, the more money that will be generated for the service provider system. As such, the system described above not only aspire to attract as many customers as possible, but where possible, to have as many repeat customers as possible.

Therefore, the goal of each of the service provider systems described above is to provide improved compensation for the service providers and as a result, the systems themselves. Unfortunately, current means do not exist for tracking previous customers of the system. This customer relationship management aspect is not available in current systems, but could certainly be utilized in order to generate additional capital for the service providers available to the systems and as a result, provide additional compensation for the service provider systems. Generally, the system may keep a percentage of the fees paid to service providers for providing live advice and therefore directly benefit by having repeat customers.

Therefore, there remains a need to overcome one or more of the limitations in the above-described existing.

SUMMARY OF THE INVENTION

The present invention presents a method and apparatus for online advice customer relationship management. The method includes the determination of a service provider ID code from a requesting service provider. Once a service provider ID code is determined, a list of service seekers that have received advice regarding a field of service from a service provider corresponding to the service provider ID code is generated. Once generated, the listing of service seekers is displayed via customer display screen. As such, system administrators, as well as the service providers themselves, may view listings of service seekers in order to provide relationship management of the service seekers, such as for example, providing incentives to service seekers for follow-up live advice, as well as blocking undesired service seekers from further contact with the service provider.

The present invention provides many advantages over known techniques. The present invention includes the ability to enable service providers of service provider systems to track the various customers that have received advice communication from the various service providers. In doing so, the service providers may provide incentives to service seekers that have received advice from the service provider in order to induce repeat business. The service provider can also track service seekers and receive alerts from the system for initiating e-mail contact with service seekers that have expressed interest in engaging in repeat business. The customer relationship tool described herein enables service providers to track clients in order to generate follow-up business, which will provide increased compensation for the service providers and as a result, provide increased compensation for the service provider system, which collects a portion of the fees charged by the service providers for providing live advice regarding one or more fields of service.

BRIEF DESCRIPTION OF THE DRAWINGS

The present invention is illustrated by way of example, and not by way of limitation, in the figures of the accompanying drawings and in which:

FIG. 3 depicts a web page illustrating a customer management screen in accordance with a further embodiment of the present invention.

FIG. 4 depicts a web page illustrating a customer detail screen in accordance with a further embodiment of the present invention.

FIG. 5 depicts a web page illustrating a customer contact screen in accordance with a further embodiment of the present invention.

DETAILED DESCRIPTION

Figure 1:
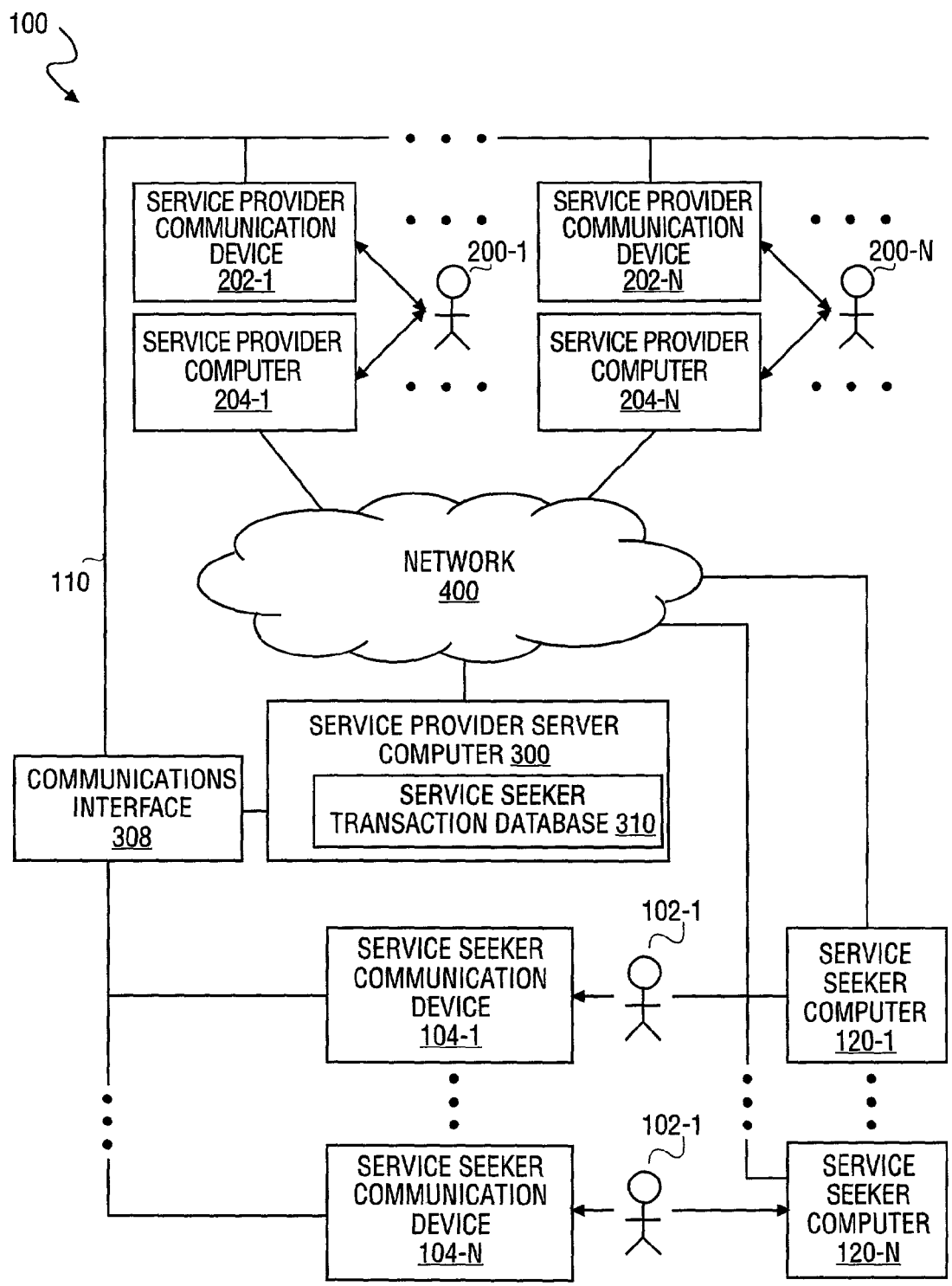
FIG. 1 depicts a block diagram illustrating a service provider system, including online advice customer relationship management in accordance with one embodiment of the present invention.

A method and apparatus for online advice customer relationship management are described. The method includes the determination of a service provider ID code from a requesting service provider. Once a service provider ID code is determined, a list of service seekers that have received advice regarding a field of service from a service provider corresponding to the service provider ID code is generated. Once generated, the listing of service seekers is displayed via a customer management screen. As such, system administrators, as well as the service providers themselves, may view listings of service seekers in order to provide relationship management of the service seekers, such as for example, providing incentives to service seekers for follow-up advice communication, as well as blocking undesired service seekers from further contact with the service provider.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

FIG. 1 depicts one embodiment of a service provider system architecture 100 in which the systems and methods of the present invention may be incorporated. The service provider system 100 includes one or more service seeker computers 120 (120-1, . . . , 120-N) connected through a network 400 (such as an Intranet, an Extranet, a LAN or a WAN such as the Internet) to a host computer or web server ("service provider server computer") 300. One or more service provider computers 204 are also connected to the service provider server computer 300 via the network 400. Persons skilled in the art will recognize that the service provider server computer 300 may include one or more computers working together to provide the server computer functions described herein.

The system 100 also includes one or more service providers 200 (200-A, ..., 200-N) each having a communications device 202 (202-1, ..., 202-N) that is connected to a communications network 110. Accordingly, one or more service seekers (users) 104 (104-1, ..., 104-N) access the service provider system via either communications devices 104 (104-A, ..., 104-N) that are connected to the communications network 110 or service seeker computers 120. In accordance with the teachings of the present invention, a user 102 can send a request 106 (106-A, ..., 106-N) via the communications device 104 or service seeker computer 120, which is received by the service provider server computer 300.

As described in further detail below, the service provider server computer 300 can then automatically connect the user 104 to a selected service provider 200 for a live conversation either via the communication devices 102 and 202 or the computers 120 and 204. Accordingly, when the request 106 is provided via a communication device 104, the request 106 may be in the form of either a voice command or keypad entry. As described in further detail below, the service provider server computer 300 can then connect the service seeker 102 to a selected service provider 200 for a live conversation via the communications/audio interface 308.

The communications network 110 generally refers to any type of wire or wireless link enabling the transmission of voice data such as, but not limited to, a public switched telephone network, a wireless communications network, a local area network, a wide area network or a combination of networks. The communications devices 104 and 200 generally refer to any type of device capable of receiving speech or keypad entry from a user and providing the speech/keypad entry to a destination via a communications network, such as the communications network 110. In an embodiment of the present invention, the communications network 110 is a public switched telephone network and the communications device 104 and 200 are telephones.

However, in contrast to service provider systems described in U.S. patent application Ser. No. 09/414,710 and U.S. patent application Ser. No. 09/702,217, service provider system 100, as depicted in FIG. 1, includes a service seeker transaction database 350. The service seeker transaction database contains a transaction record for each advice communication between a service seeker and a selected service provider. As will be described in further detail below, the advice communication may be in the form of a live advice conversation as described above, a recorded advice communication, as well as a written advice communication via, for example, electronic mail.

Accordingly, as each communication occurs between service seekers and service providers, a transaction record is generated in the service seeker transaction database 350 in order to enable customer management procedures, as will be described in further detail below, to provide service providers with listings of each service seeker that has received an advice communication from the service provider. As such, service providers, or system administrators, may view their respective service seekers (customers) via listings provided by customer management procedures, as will be described in further detail below.

Using the various procedures provided, the service providers can provide incentives to service seekers in order to induce the service seekers to engage in additional receipt of advice communication, thereby generating additional compensation to the service providers, as well as providing additional compensation to the service provider system 100. In addition, the customer management procedures provide further functionality for processing service seeker listings, as will be described in further detail below.

Figure 2A:
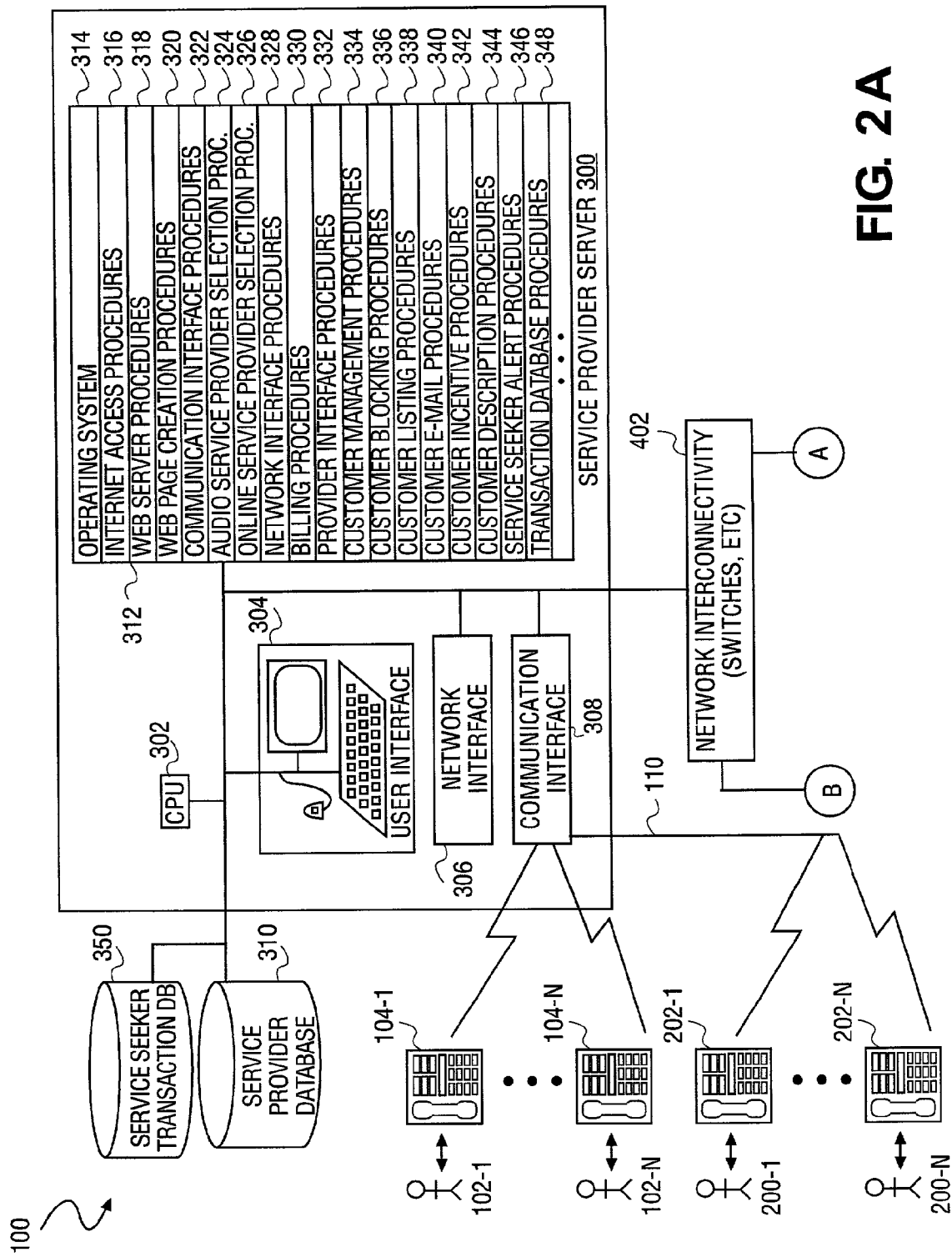
FIGS. 2A and 2B depict block diagrams further illustrating the service provider system as shown in FIG. 1.

Referring now to FIG. 2A, FIG. 2A further illustrates the service provider system 100, including the service provider server computer 300, as well as the service provider communication devices 202 and the service seeker communication devices 104 coupled to the communications interface 308. The service provider server computer 300 includes a central processing unit (CPU) 302, a user interface 304, a network interface 306, a communications interface 308, a service provider database (DB) 310, a service seeker transaction DB 350 and a memory 312. The service provider server computer 300 can be any type of computing device, such as, but not limited to, desktop computers, work stations, lap tops and/or mainframe computers.

The communications interface 308 is used to communicate with users 102 and service providers 200, as well as other system resources not shown. In one embodiment, the communications interface 308 receives an audio request 106 provided by user 102 through a communications 104, which is provided over the communications network 110. The communications interface 308 provides digitized voice requests to the audio portal server computer 300 for interactive voice recognition, including voice processing, speech recognition and text-to-speech processing. In addition, communications interface 308 provides digitized keypad responses to the service computer for decoding of dual tone multi-frequency (DTMF) signals.

The network interface 306 is used to connect a user computer 120 to a selected service provider computer 202 for real-time communication, such as voice over Internet Protocol (IP), video over-IP, or the like. The memory 312 of the service provider server computer 300 may be implemented as RAM (random access memory), SRAM (synchronous RAM), SDRAM (synchronous data RAM) or a combination of RAM and non-volatile memory, such as one or more memory modules, storage volumes, or magnetic disk storage units. The memory can contain any of the following:
- an operating system 314;
- internet access procedures 316;
- web server procedures 318;
- web creation procedures 320;
- communications interface procedures 322 for receiving an audio request (voice/keypad entry) 106 from the user 102 via the communications interface 308 and utilizing either integrated voice recognition (IVR) for voice requests or dual tone multi-frequency (DTMF) decoding for keypad entry request to provide the user with a selected service provider and connect the service seeker 102 with the selected service provider 200 for a live conversation;
- audio service provider selection procedures 324 for providing the service seeker 102 with keypad entry options for direct service provider connection by entering a service provider extension or browsing fields of service from an auditory list of fields of service providers provided by the system 100, including corresponding keypad entry codes, auditory lists of service providers matching a field of service selected by the user 102, as well as receiving various descriptors for narrowing the search of service providers, including acceptable price ranges, acceptable quality ratings, specific languages, as well as a service provider ID of a specific service provider when known by the service seeker 102;
- online service provider selection procedures 324 for providing the service seeker 102 with an online interface for providing listing of fields of service available from the audio portal system 100, as well as receiving various descriptors for narrowing the search of service providers, including acceptable price ranges, acceptable quality ratings, specific languages, as well as a service provider ID of a specific service provider when known by the service seeker 102;

network interface procedures 326 for directing the network interface 306 to connect a user computer 1230 to a selected service provider computer 202 for real-time communication, such as voice over Internet Protocol (IP), video over-IP, or the like, once a service provider is selected;

billing procedures 330 for billing the service seeker 102 following an advice communication exchange with the service provider 200, as well as compensating the service provider 200 for the advice communication exchange and collecting a premium fee for the service provider system 100;

provider interface procedures 332 for providing an on-line interface, as well as an audio interface (e.g., via telephone), to service providers 200 requesting inclusion in the service provider database 310 in order to provide live services via the audio portal system 100 to perspective users 102;

allowing service providers 200 to update information in the service provider database 310, including times of availability;

customer management procedures 334 for providing a service provider, or system administrator, with a listing of service seekers which have received an advice communication from a respective service provider, the advice communication including live advice via communications devices 104 and 202 or voice and video over-IP via computers 120 and 204, recorded advice and written advice, to enable service seekers to perform customer relationship management of service seekers, including providing incentives for repeat business, customer lists, as well as blocking selected service seekers from future advice communications;

customer blocking procedures 336 for receiving a selection for one or more service seekers and blocking the selected service seekers from receipt of future advice communications from the service provider;

customer listing procedures 338 for generating customer lists created by the service provider and placing selected service seekers within the customer listings generated by the service provider;

customer e-mail procedures 340 for enabling the generation of an e-mail to one or more service seekers selected by the service provider to provide, for example invitations, as well as incentives to the selected service seekers, in order to entice the service seekers to receive future communications advice from the selected service provider;

customer incentive procedures 342 for providing communication incentives to service seekers, which have engaged in repeat receipt of advice communications from a selected service provider in response to received communication incentives via, for example e-mail, including, for example, free minutes, cash prizes or the like;

customer description procedures 344 utilized by the customer listing procedures 338 in order to enable a service provider to enter comments regarding one or more selected service seekers describing, for example, communication notes gathered by the service provider during advice communications with the one or more service seekers;

service seeker alert procedures 346 for notifying a service provider to initiate contact with the selected service seekers in order to provide the designated service seekers with communication incentives and invitations for follow-up advice communications therebetween;

transaction database procedures 348 for generating a transaction record within the transaction database 350 for each advice communication between a service provider and a service seeker, as well as accessing the transaction database at the request of the customer management procedures 334 in order to select a list of service seekers that have received advice communications from a respective service provider; and other procedures and files.

Figure 2B:
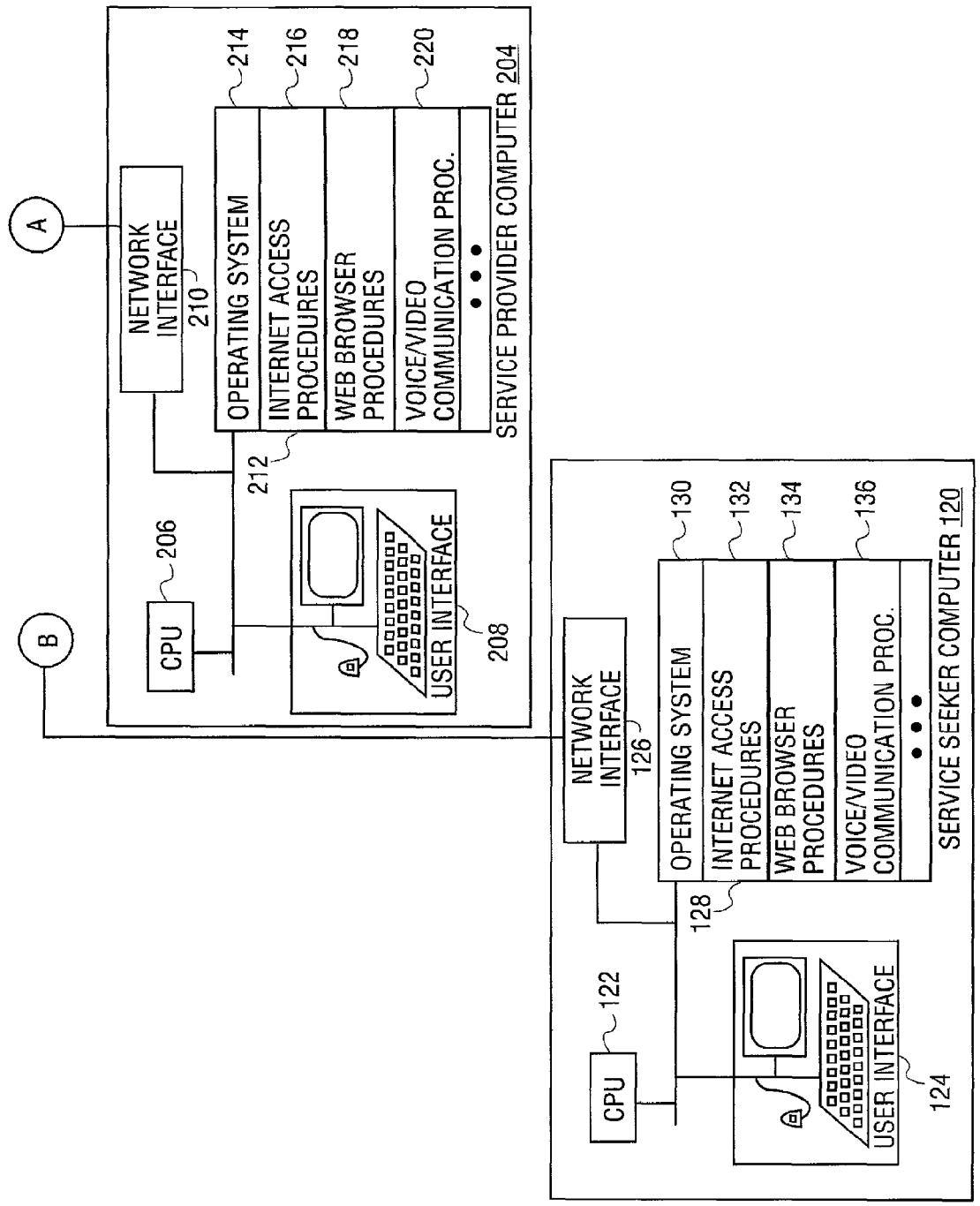

FIG. 2B illustrates the service seeker computer 120, which includes a CPU 122, a user interface 124, a memory 128 and a communications interface 126. The communications interface 126 is used to communicate with the service provider server computer 300, as well as other system resources not shown. Additionally, the service seeker computer may include a microphone as well as a digital video camera, utilized by voice/video procedures 136, for enabling voice over-IP or video over-IP communication between a user 102 and a selected service provider 200.

The memory 128 of the service seeker computer 120 may be implemented as RAM (random access memory) or a combination of RAM, SRAM (synchronous RAM), SDRAM (synchronous data RAM) and non-volatile memory, such as one or more memory modules, storage volumes, or one or more magnetic disk storage units. The memory 128 can contain the following:

an operating system 130;

internet access procedures 132;

web browser procedures 134 for accessing online applications, such as service provider computer 300;

voice/video communication procedures 136 for enabling voice over-IP or video over-IP communication between a user 102 and a selected service provider 200; and other procedures and files.

FIG. 2B also illustrates the service provider computer 202, which includes a CPU 204, a user interface 206, a memory 210 and a communications interface 208. The communications interface 208 is used to communicate with the voice portal server computer 300, as well as other system resources not shown. Additionally, the service provider may include a microphone as well as a digital video camera, utilized by voice/video communication procedures 220, for enabling voice over-IP or video over-IP communication between a user 102 and a selected service provider 200.

The memory 210 of the service provider computer 202 may be implemented as RAM (random access memory) or a combination of RAM and non-volatile memory, such as SRAM (synchronous RAM), SDRAM (synchronous data RAM) and one or more magnetic disk storage units. The memory 210 can contain the following:

an operating system 212;

internet access procedures 214;

web browser procedures 216 for accessing online applications, such as service provider computer 300;

voice/video communication procedures 216 for enabling voice over-IP or video over-EP communication between a user 102 and a selected service provider 200; and as well as other procedures and files.

The embodiments depicted in FIGS. 2A and 2B include a service provider database 310 containing information about a wide array of service providers 200. In order to present themselves to their potential clients (service seekers), service providers 200 list themselves in this database 310. In one embodiment, this is done through the use of an Internet web site, via web pages (not shown) provided by the service provider interface procedures 332. The service provider 200 registers his/her name and phone number using the web page, along with a description of the service that he/she offers. The description includes key words describing the field of service. The description also includes a price for rendering the service, most commonly, but not restricted to a per-minute price.

The service provider 200 then informs the system 100 of the times when he/she is available to receive calls. Switching service provider 200 availability status can be done online or through a communications device, such as a telephone. Once the database 310 contains the phone numbers of service providers, descriptions of their services, their prices, and their real-time availability statuses, the audio portal system 100 can provide services to users 102 desiring corresponding services.

In one embodiment a telephone is used as part of the delivery mechanism or communications device 104 and 202 of the system 100. A user 102 seeking services (service seekers) dials a central telephone number and then listens to a series of options, including entry of verification information, such as a personal information number (PIN) code. The seeker can select keypad request or voice request to indicate the type of service he would like to receive by speaking the name of a profession, such as "psychiatrist," which is processed by the system's audio interface 308 using audio interface procedures 322.

In an alternate embodiment, the service seeker 102 can listen to a series of professions and press the numerical keypad to select one by selecting a field of service browse option. Accordingly, the system accepts keypad or voice response from a service seeker 102 and continues until the desired field of service is selected. In addition, when known, the service seeker 102 can select a direct connection and provide a service provider ID (telephone extension) of a desired service provider for immediate connection with the selected service provider (as described above).

Once the user 102 has indicated a field of service using the service provider selection procedures 324/326, the system 100 searches its database 310 for service providers in that field. The service provider selection procedures 324/326 allow the user 102 to further narrow the search for a service provider 200 by speaking—or pressing into the telephone keypad—a price, such as "50 cents per minute." The server computer 300 will then narrow the search in the database 310 for service providers 200 that match the price range.

The service seeker 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

Once converted, the service provider selection procedures 324 will query the service provider database 310 using the user selection in order to provide either service providers within a field of service selected by the user or corresponding service provider selected by the user. Accordingly, in certain embodiments, prior users may enter a service provider code number for immediate connection to the service provider. Accordingly, the seeker can avoid delays provided via interface prompts required by new users in order to familiarize users with the fields of service available from the audio portal system 100. In one embodiment, if the service provider is not available, the seeker is given the option to connect with the highest rated service provider within the corresponding category. As such, the service provider selection procedures 324/326 include both IVR software, as well as DTMF decoding software, depending on whether the user's responses are provided as voice responses or keypad entry.

Once a service provider 200 with the desired characteristics has been chosen, the audio portal system 100 will automatically connect the service seeker 102 with the selected service provider 200, assuming the service provider is available. Once both the service seeker 102 and provider 200 are on the phone line 110, the system 100 conferences the two phone calls together, enabling services to be rendered in a live conversation. The system keeps track of the time spent on the phone call using the conversation monitoring procedures 340. The service seeker 102 is then billed accordingly, and the funds are transferred to the provider 200 using the billing procedures 328. In addition, a transaction record is generated within the transaction by using the transaction DB procedures 348.

Referring now to FIG. 3, FIG. 3 depicts a block diagram illustrating a customer management screen 500 in accordance with one embodiment of the present invention. The customer management screen 500 is generated using the customer management procedures 334 in response to selection of a customer management link within, for example, a service provider management page (not shown). As indicated, the customer management screen 500 includes a listing of service providers 520 that have received advice communications from the respective service provider.

As described above, the advice communications may be in the form of a live advice communication via a communications device, such as a telephone, as indicated by col. 530, as well as recorded advice communications, as indicated by col. 532, and written advice communications, as indicated by col. 534. In addition, the listing includes the last contact date with the respective service seeker, as indicated by col. 536, as well as a total earnings col. 538, and a customer type col. 540. In addition, the customer management screen 500 provides a service provider with one or more options.

In the embodiment depicted, the service provider is provided with a compose e-mail option 506, a block option 508 and assign to list option 510. In order to use the provided options, a service provider will select checkboxes, indicated at col. 522, by for example, mouse clicking on the various checkboxes corresponding to desired service seekers. Once selected, the service provider can click on an option. Once the option is selected by the service provider, the customer management procedures 334 will process the selected service providers according to the selected option. When a service provider selects the compose e-mail option 506, the customer e-mail procedures 340 are performed.

In one embodiment, the procedures 340 provide the service provider with an electronic mail generation screen in order for the service provider to enter desired information within the electronic mail. Once entered, the electronic mail will be sent to the selected service seekers. The electronic mail option may be utilized by service providers in order to provide incentives to the selected service seekers in order to entice the service seekers to engage the service providers' assistance in the form of an advice communication. When a service seeker responds to a communication incentive, the customer incentive procedures 342 will compensate the service seeker once the advice communication is complete.

Figure 6:
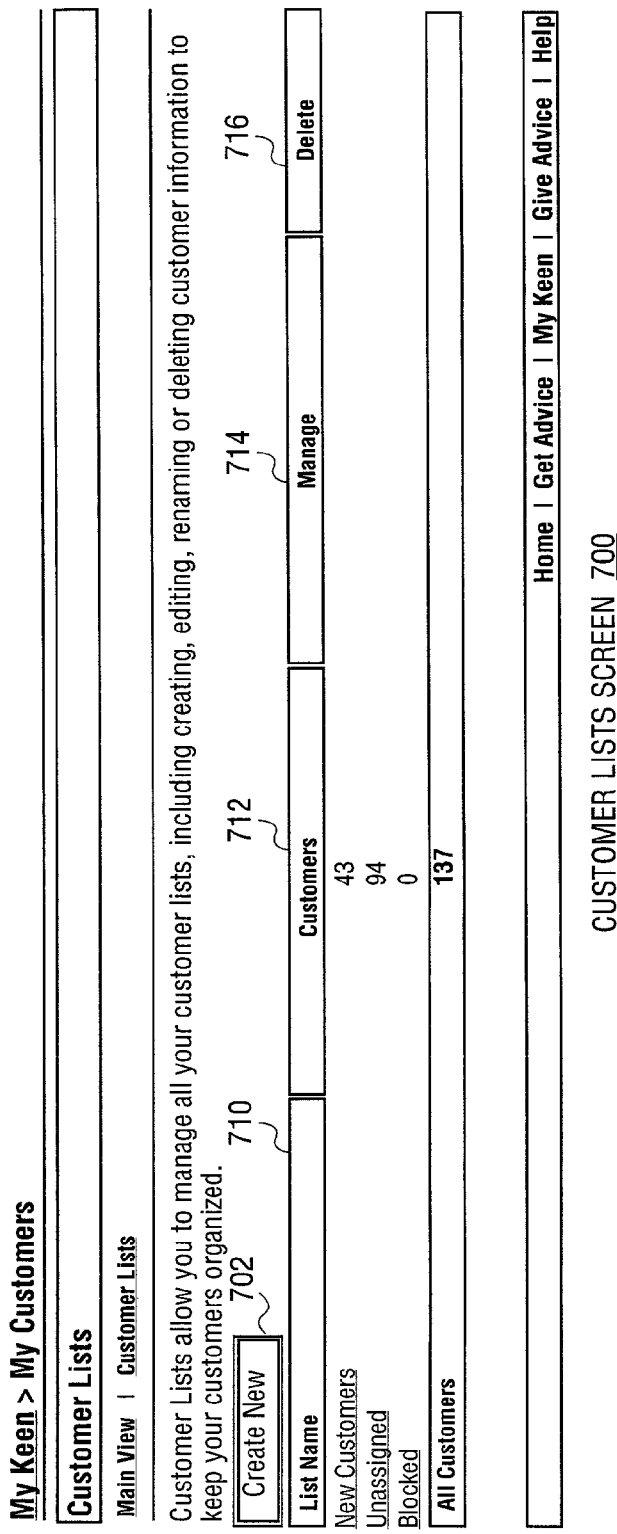
FIG. 6 depicts a web page illustrating a customer list screen in accordance with an exemplary embodiment of the present invention.

The block option 508 enables a service provider to select one or more of the service seekers within the list 520. Once selected, the block option 508 will invoke customer blocking procedures 336, which will prohibit the selected service seekers from engaging in future receipt of advice communications from the service provider. This is a very valuable feature for service providers that have encountered undesirable service seekers and would much rather prevent and avoid future contact with the undesirable service seekers. Finally, the assign to list option 510 invokes the customer listing procedures 338 to enable to the service provider to select one or more of the service seekers and to assign the service seekers to various lists, as depicted in FIG. 6, utilizing customer list screen 700.

Referring now to FIG. 4, FIG. 4 depicts a customer detail screen 600, which is generated by the customer management procedures 334, when the user clicks on a service seeker from service seeker list 520. The customer detail screen will include the member name 602 and when necessary, an alert 604, as well as options for responding to the alert, such as sending Keen mail 608 and sending an invitation 610. The service seeker alert procedures 346 are utilized in order to alert service providers of service seekers that have expressed interest in additional receipt of advice communication. Accordingly, the indicated service seekers should be contacted in order to entice the service seekers to engage the service provider for additional advice communications.

In one embodiment, alerts are generated for service seekers based on a total earnings amount from the service seeker, ratings received from the service seeker, as well as a last contact date from or with the respective service seeker. As indicated, the customer detail screen will include a contact summary 620, which will include a total earnings amount, average feedback given, type of contact, amount earned, number of contracts, number of minutes, last contact (in days). Finally, a contact screen 630 will include a type of contact with the user 634, as well as the date. The contact screen 630 also includes a note portion for the service provider to enter notes with regard to the respective service seeker.

Referring now to FIG. 5, FIG. 5 depicts a customer contact screen 630, as depicted in FIG. 4. The customer contact screen 630 allows the service provider to enter notes regarding a respective service seeker, as well as viewing the type of contact with the service seeker 634, as well as an amount earned from the service seeker. Such notes may be utilized during future advice communications with the respective service provider in order to provide improved advice communications therewith.

Finally, referring to FIG. 6, FIG. 6 depicts customer list screen 700, which may include the names of the various lists generated by the service provider. By default, the customer list will automatically include a new customers list, an unassigned customers list, as well as a block customers list. Procedural methods for describing and implementing the customer relationship management features described herein are now provided.

Operation

Figure 7:
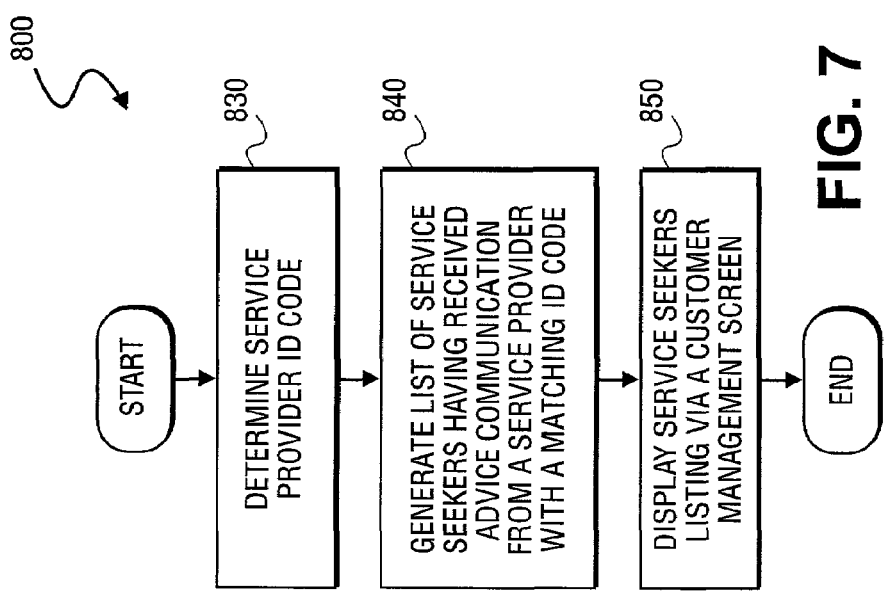
FIG. 7 depicts a flowchart illustrating a method for online live advice customer relationship management in accordance with one embodiment of the present invention.

Referring now to FIG. 7, FIG. 7 depicts a flowchart illustrating a method 800 for online advice customer relationship management within a service provider system, such as for example system 100, as depicted in FIGS. 1 through 2B. As such, the method described enables service providers to track customers, or service seekers, that have received advice communications from the service provider via e-mail, recorded advice or live advice communication via communication devices, such as standard telephones. Utilizing the methods described herein, a service provider can keep track of the various customers that have been provided advice communications via listings of the various customers, or service seekers.

Using the listings, the service provider can select customer management options, as will be described in further detail below, as well as providing incentives to previous customers in order to entice the customers to engage in repeat receipt of advice communications from the service provider. Accordingly, virtually any system that provides live advice via communications devices, such as telephones or online advice via voice or video over-IP, as well as recorded information, can keep track of its customers. In addition to customer tracking, the method enables providing of customers with incentives in order to generate repeat business, which will result in increased compensation for the various providers and, in effect, generate additional compensation for the systems which provide these advice communications.

The online advice customer management method 800 begins at process block 830, wherein a service provider ID code is determined. Once the service provider ID is determined, a list of service seekers that have received advice communications regarding a field of service from the service provider are generated. In one embodiment, this listing is generated using customer management procedures 334 by selecting service seekers that have received advice communications from a service provider corresponding to the service provider ID code determined at process block 830. Finally, at process block 850, the listing of service seekers is displayed via a customer display screen, such as depicted in FIG. 3. Once displayed, the service seeker can perform relationship management of the listed service seekers in order to provide, for example repeat advice communication incentives, customer list management, as well as blocking customers from repeat receipt of advice communications.

Figure 8:
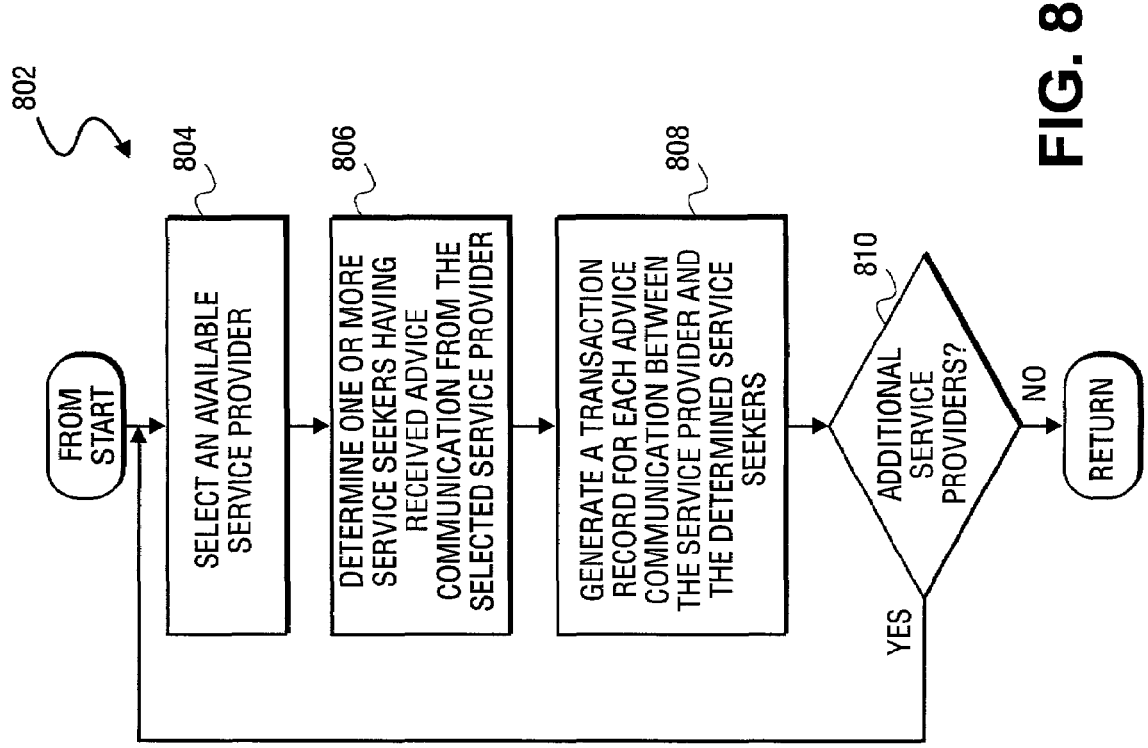
FIG. 8 depicts a flowchart illustrating an additional for generating transaction records in order to enable online customer relationship management in accordance with a further embodiment of the present invention.

Referring now to FIG. 8, FIG. 8 depicts a flowchart illustrating an additional method 802, which is performed prior to determining of the service provider ID code at process block 830. At process block 804, a service provider is selected from a service provider system, such as for example the service provider system as depicted in FIGS. 1 through 2B. Once selected, at process block 806, one or more service seekers are determined that have received advice communications regarding a field of service from the selected service provider. Next, at process block 808, a transaction record is generated within a service seeker transaction database 350 for each determined service seeker.

In one embodiment, this is performed using the transaction database procedures 348. Finally, at process block 810, process block 804 through 808 are repeated for each service provider available from the service provider system 100. Accordingly, for each advice communication engaged between a service seeker and a service provider, the system 100 will generate a corresponding transaction record in order to enable the customer relationship management process as described herein.

Figure 9:
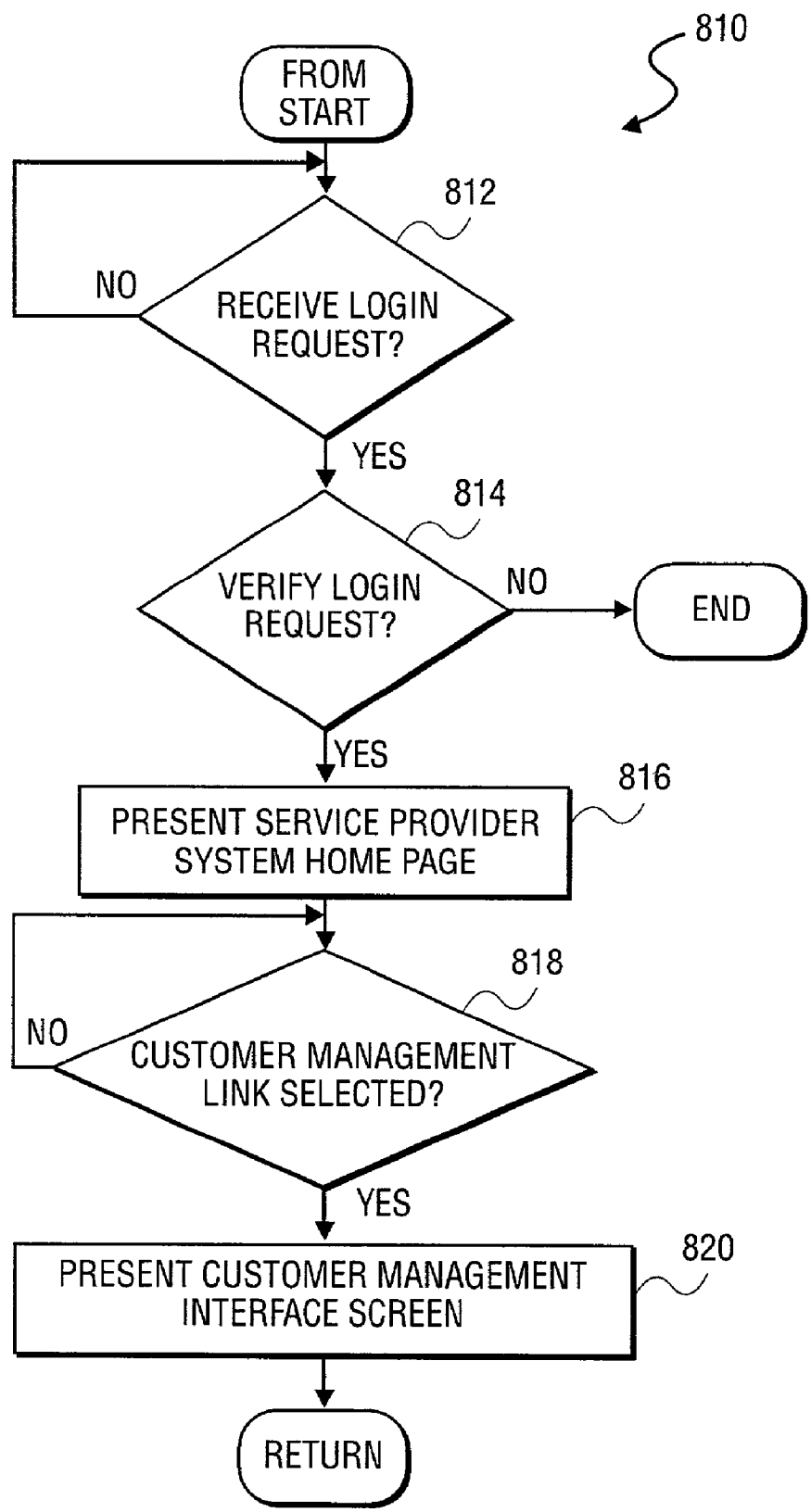
FIG. 9 depicts a flowchart illustrating a method for enabling a service seeker to engage the online customer relationship management system in accordance with a further embodiment of the present invention.

Referring now to FIG. 9, FIG. 9 depicts a flowchart illustrating an additional method 810, which is performed prior to determination of the service provider ID code at process block 830. At process block 812, it is determined whether a login request is received. Once the login request is received, at process block 814, it is determined whether a service provider password corresponds to the service provider ID contained within the login request. Assuming the service provider is verified, process block 816 is performed. Otherwise, the procedure terminates. Once verified, at process block 816, the service provider is presented with a service provider system homepage. Next, at process block 818, it is determined whether the service provider has selected a customer management link. Once the service provider selects the customer management link, process block 820 is performed. At process block 820, the service provider is presented with a customer management interface screen 500, for example as depicted in FIG. 3.

Figure 10:
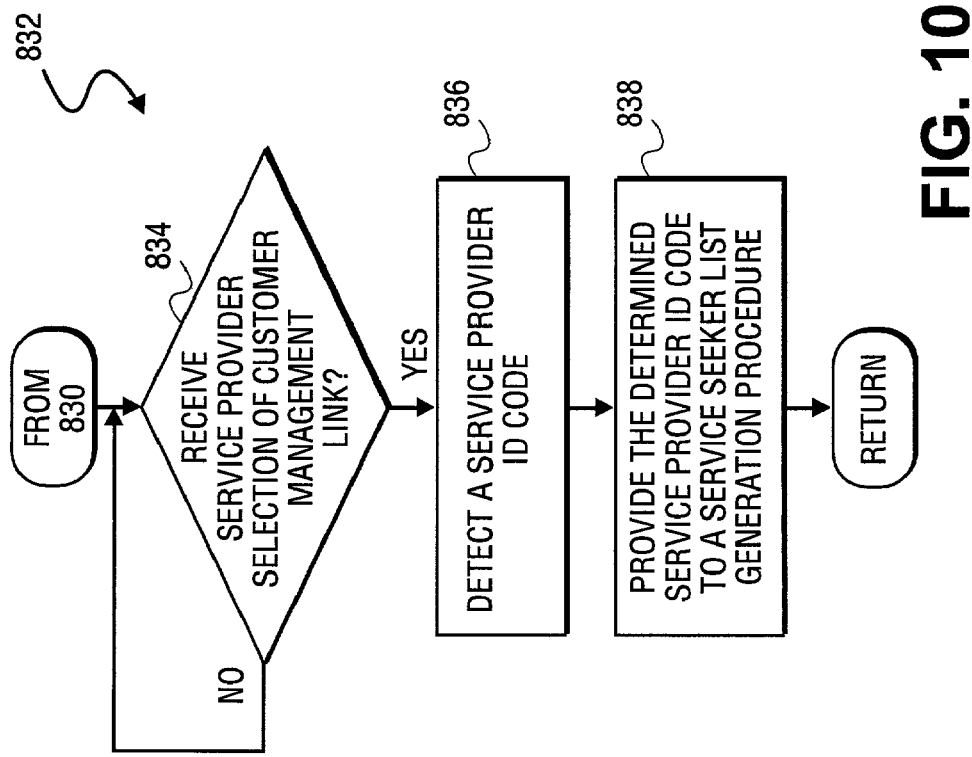
FIG. 10 depicts a flowchart illustrating an additional method for determining a service provider ID code of a service provider in accordance with the further embodiment of the present invention.

Referring now to FIG. 10, FIG. 10 depicts a flowchart illustrating an additional method for determining the service provider ID code of process block 830, as depicted in FIG. 7. At process block 834, it is determined whether a service provider selection of a customer management link is received. Once received, at process block 836, a service provider ID code of the service provider is detected. Finally, at process block 838, the determined service provider ID code is provided to a service seeker list generation procedure, such as for example customer management procedure 334, as depicted in FIG. 2A.

Figure 11:
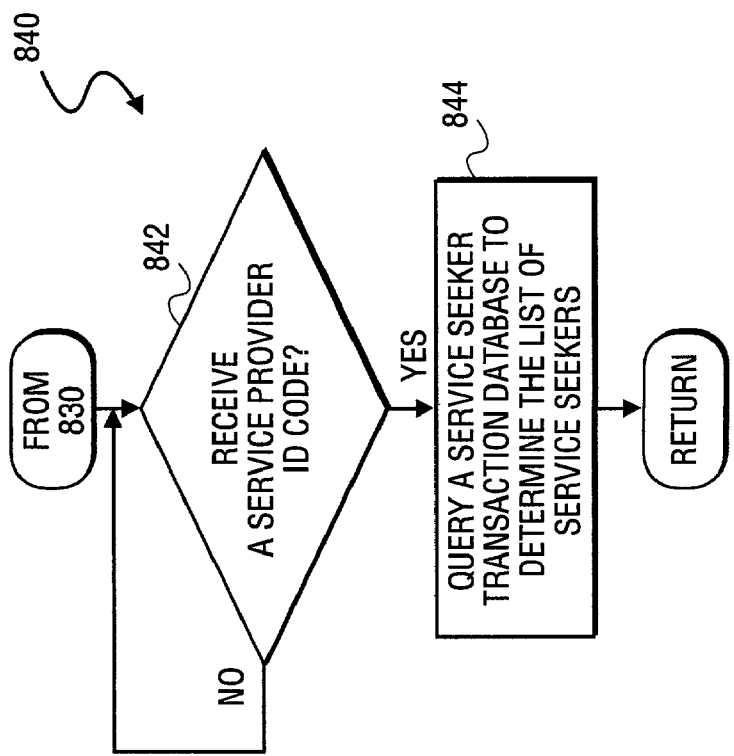
FIG. 11 depicts a flowchart illustrating an additional method for generating a list of service seekers having received advice communication from a respective service provider in accordance with a further embodiment of the present invention.

Referring now to FIG. 11, FIG. 11 depicts a flowchart illustrating an additional method 842 for generating the listing of service seekers of process block 840, as depicted in FIG. 7. At process block 842, it is determined whether a service provider ID code is received. Once the service provider ID code is received, a service seeker transaction database 350 is queried to determine the list of service seekers having received advice communications from a service provider matching the service provider ID code. Querying of the service seeker transaction database 350 is performed using, for example the transaction database procedures 348, and will include a listing of service seekers that have received advice communications via a communications medium, such as a telephone, recorded advice and written advice, via, for example, electronic mail.

Figure 12:
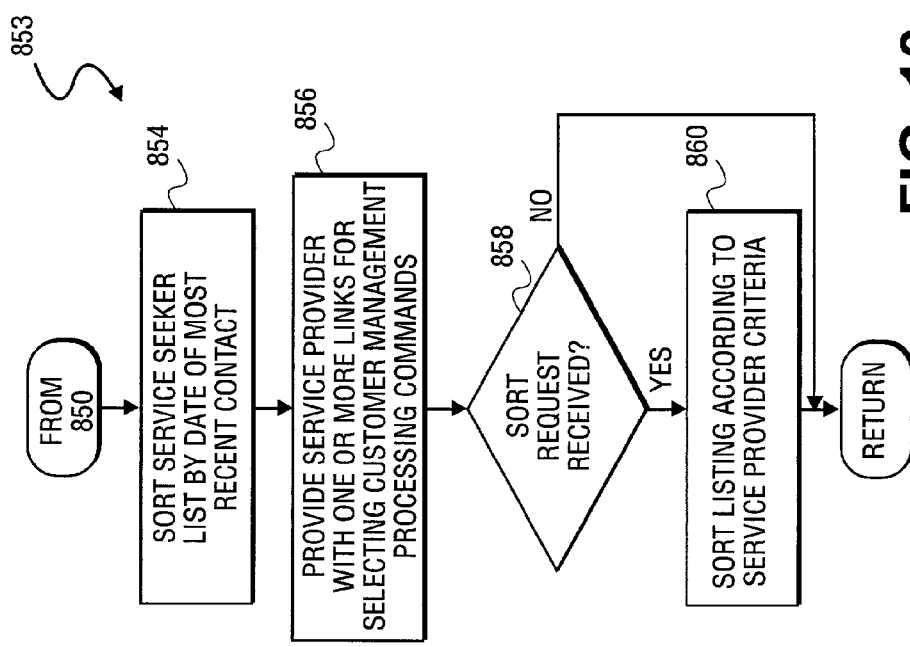
FIG. 12 depicts a flowchart illustrating an additional method for displaying a listing of service seekers via customer display screen in accordance with a further embodiment of the present invention.

Referring now to FIG. 12, FIG. 12 depicts a flowchart illustrating an additional method 852 for displaying the listing of service seekers of process block 850, as depicted in FIG. 7. At process block 854, the list of service seekers is sorted according to a data of most recent contact with the corresponding service provider. Next, at process block 856, a user, such as for example the service provider or a system administrator, is provided with one or more links for selecting customer management processing commands. The customer management processing commands are utilized for processing one or more selected service seekers contained in the listing, for example as depicted in FIG. 3.

In one embodiment, the customer management processing commands include e-mail generation options, customer blocking options and list generation options, which are provided using procedures 336 through 342, as depicted in FIG. 2A. At process block 858, it is determined whether a sort request is received from the user, such as for example, by clicking one of the columns, as depicted in FIG. 3A. When a sort request is received, at process block 860, the listing is sorted according to criteria provided by the service provider.

Figure 13:
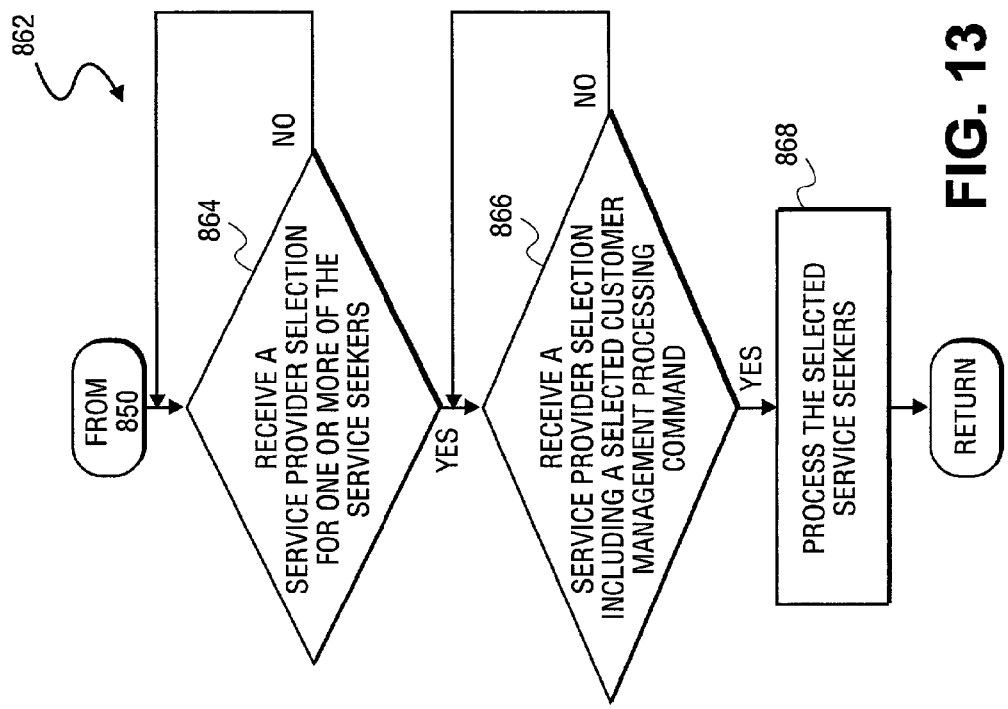
FIG. 13 depicts a flowchart illustrating an additional method for processing selected service providers within a display listing in accordance with an exemplary embodiment of the present invention.

Referring now to FIG. 13, FIG. 13 depicts a flowchart illustrating a method 862 for processing a service seeker listing utilizing one or more of the customer management options, as depicted in FIG. 3. At process block 864, a service provider selection is received for one or more of the service seekers contained in the service seeker display screen 500, as depicted in FIG. 3. Next, at process block 866, a service provider selection for a customer management processing command is received. Finally, at process block 868, the selected service seekers are processed according to the selected customer management processing command.

Figure 14:
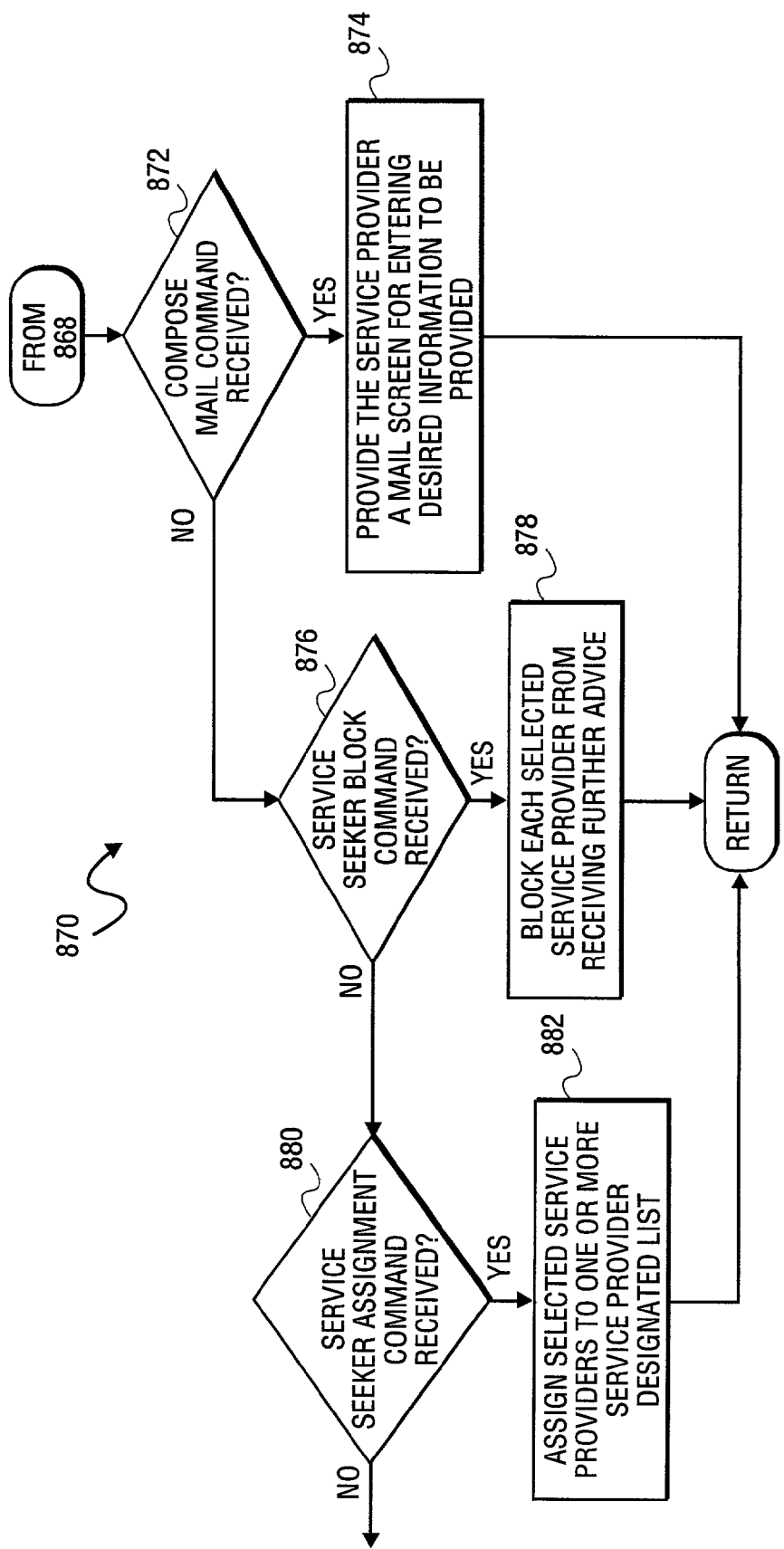
FIG. 14 depicts a flowchart illustrating an additional method for processing selected service seekers in accordance with a selected customer management processing command in accordance with an exemplary embodiment of the present invention.

Referring now to FIG. 14, FIG. 14 depicts a flowchart illustrating an additional method for processing the selected service providers of process block 868, as depicted in FIG. 13. At process block 872, it is determined whether a compose mail command is received. When a compose mail command is received, at process block 874, the service provider is provided with a mail screen for entering in desired information to be provided to each of the selected service providers via electronic mail. Otherwise, at process block 876, it is determined whether a service seeker block command is received.

When a service seeker block command is received, at process block 878, each selected service provider is blocked from receiving further advice communications from the service provider, utilizing for example, the customer blocking procedures 336, as depicted in FIG. 2A. Finally, at process block 880, it is determined whether a service seeker assignment command is received. When a service seeker assignment command is received, at process block 882, the selected service providers are assigned to one or more lists generated by the service provider, utilizing for example the customer linking procedures 338, as depicted in FIG. 2A.

Figure 15:
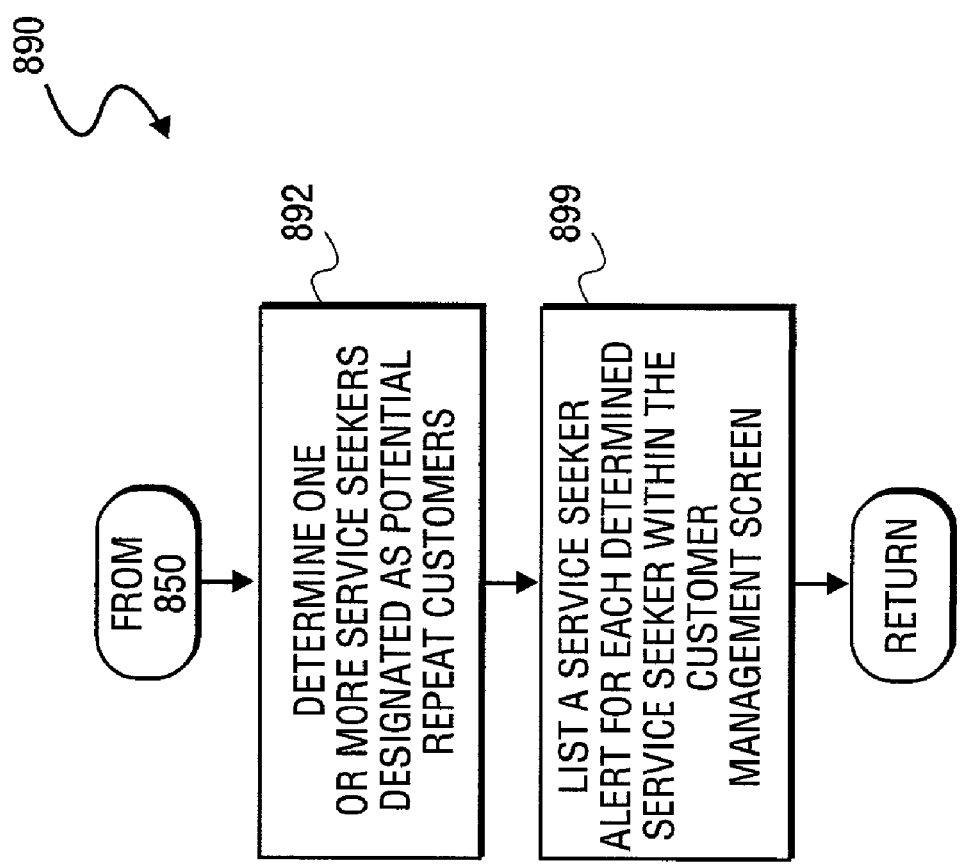
FIG. 15 depicts a flowchart illustrating a method for providing a service provider with a listing alert for one or more service seekers designated as potential repeat customers in accordance with an exemplary embodiment of the present invention.

Referring now to FIG. 15, FIG. 15 depicts an additional method 850 for providing the list of service seekers at process block 850, as depicted in FIG. 7. At process block 892, one or more service seekers are determined from the customer management screen 500, which are designated by the service provider system as potential repeat customers according to predetermined criteria. In one embodiment, the predetermined criteria may include a day of last contact, a total earnings received from the various service seekers, as well as determination of any e-mail contact received by the service provider from the service seeker.

Once determined, at process block 894, an alert is listed via the customer management screen 500, as well as via the customer detail screen 600, as depicted in FIG. 4, for each of the determined service seekers at process block 892. For example, as depicted in FIG. 4, the service provider will be provided with the member name 602, an indication for urgent follow-up 604, an option to send Keen mail 608 or send an invitation 610 in order to alert the service seeker to contact the service provider for further receipt of advice communications. Accordingly, the service provider may, via the e-mail option, send service seekers, which are indicated under service seeker alerts, with incentive compensation for repeat receipt of advice communications, utilizing for example, the service seeker alert procedures 346, as depicted in FIG. 2A.

Figure 16:
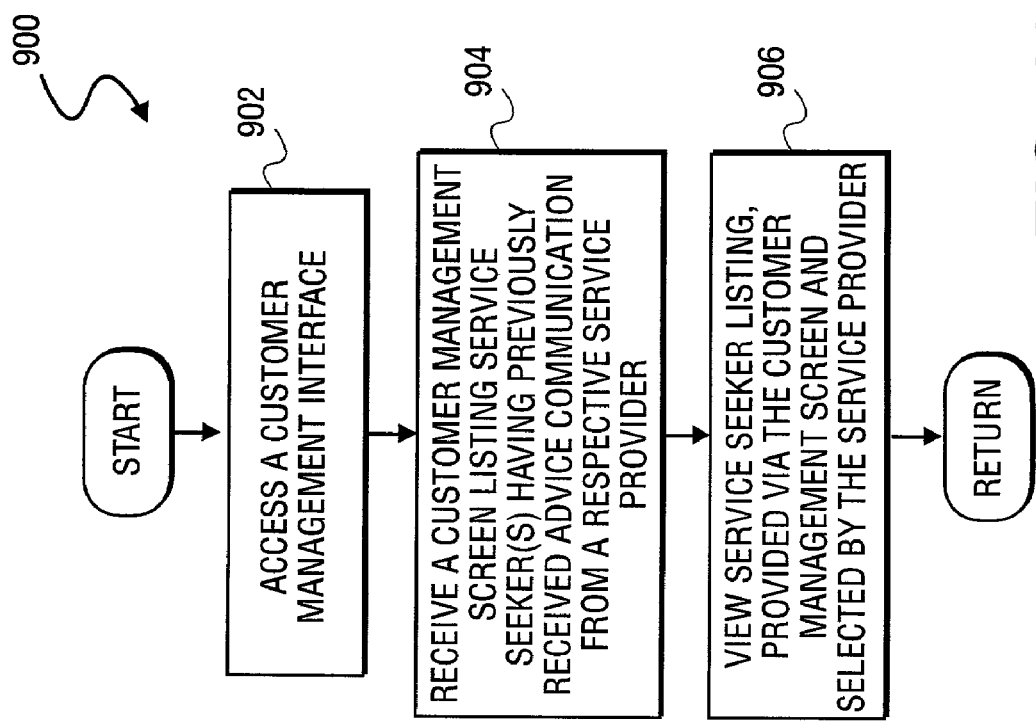
FIG. 16. depicts a flowchart illustrating a method for performing online customer relationship management of service seeker customers of a respective service provider in accordance with one embodiment of the present invention.

Referring now to FIG. 16, FIG. 16 depicts a method 900 for utilizing online advice customer relationship management provided via a service provider system, for example as depicted in FIGS. 1 through 2B, by either a service provider or a system administrator of the service provider system 100. At process block 902, a customer relationship management portion of the service provider system is accessed by a service provider. Once accessed, at process block 904, the service provider receives a customer display screen, such as for example customer management screen 500, as depicted in FIG. 3. As illustrated, the customer management screen 500 will include a listing of one or more service seekers that have received advice communications regarding a field of service from the service provider.

Finally, at process block 906, the service provider views the listing of service seekers that is processed according to one or more customer management processing options, which are provided via the customer management screen 500, as depicted in FIG. 3, and selected by the service provider. Accordingly, as depicted in FIG. 3, the service provider may select either the compose e-mail option 506, the block option 508 or the assignment to list option 510. However, it should be recognized that the customer management screen 500 is provided for illustration purposes only and should not be construed in a limiting sense. As such, those skilled in the art will appreciate that various additional customer relationship processing commands may be included and provided via online interfaces, such as the customer management screen 500.

Figure 17:
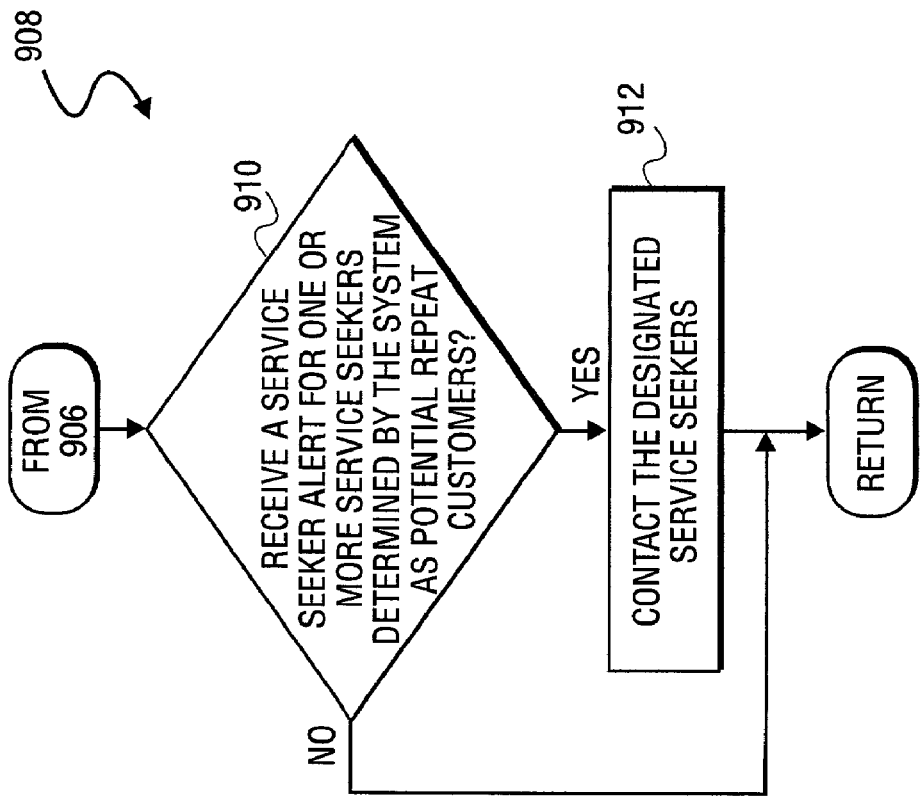
FIG. 17 depicts a flowchart illustrating an additional method for receiving a service seeker alert by a respective service provider in accordance with one embodiment of the present invention.

Referring now to FIG. 17, FIG. 17 depicts an additional method 908 for viewing the listing of service seekers of process block 906, as depicted in FIG. 16. At process block 910, it is determined whether a service seeker alert is received, via for example the customer management screen 500. When a service seeker alert is received, at process block 912, the service provider is provided with the option of contacting the designated service seekers in order to provide, for example incentives for repeat business and engagement in advice communication with the service provider. In one embodiment, the customer service alert procedures 346 will provide, in conjunction with the customer management procedures 344, a customer detail screen, which will list the alert 604 along with options for sending e-mail 608, as well as sending the selected service seekers an invitation for engagement in advice communication with the service provider.

Figure 18:
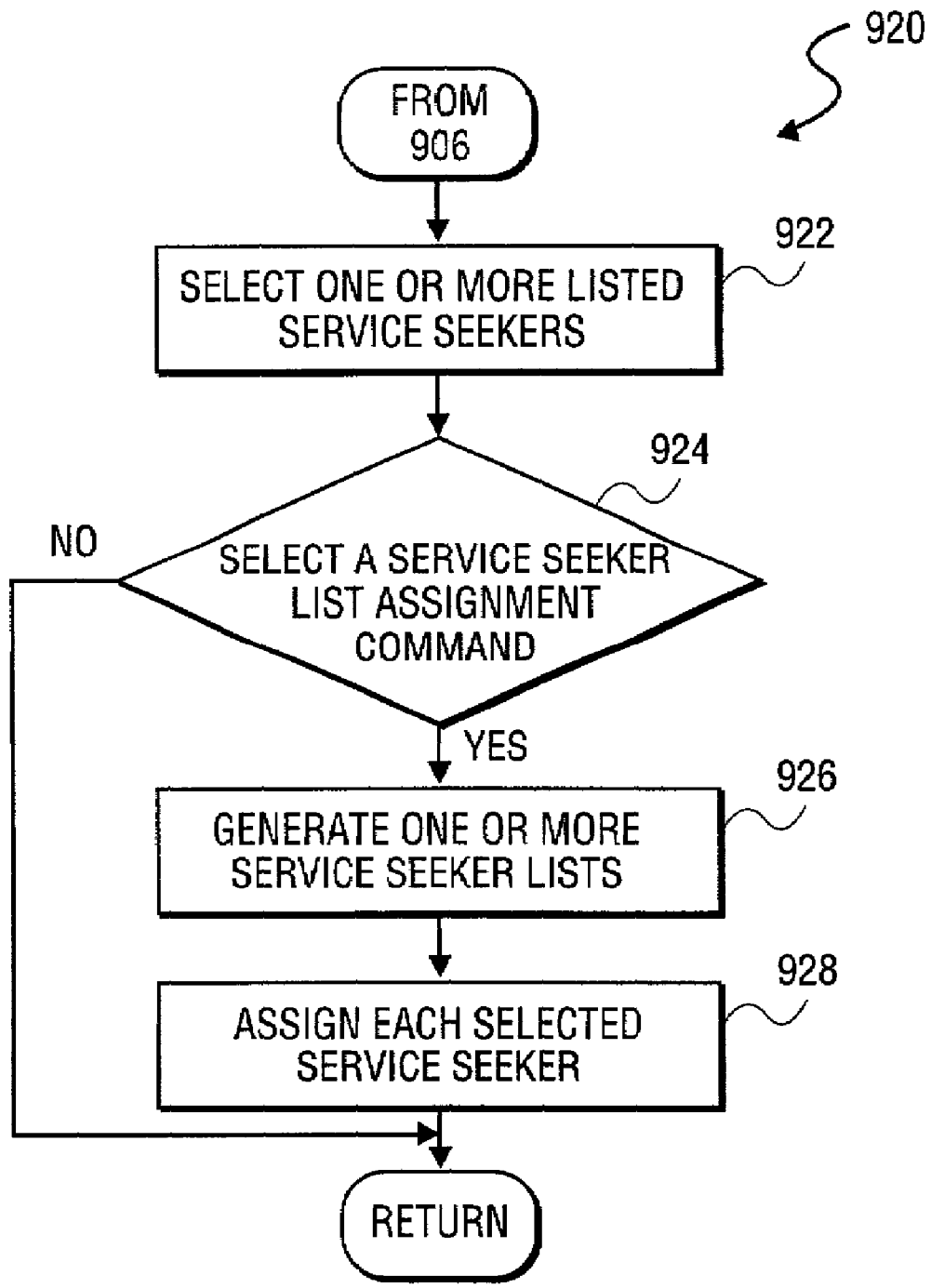
FIG. 18 depicts a flowchart illustrating an additional method for processing selected service seekers in response to a list assignment command in accordance with an exemplary embodiment of the present invention.

Referring now to FIG. 18, FIG. 18 depicts a flowchart illustrating a method 920 for processing the service seeker list according to a customer management processing option, for example as depicted in FIG. 3. At process block 922, one or more service seekers are selected from the customer management screen 500. Once selected, at process block 934, a service seeker list assignment command 920 is selected at process block 924. Next, at process block 926, one or more service seeker lists are generated, using for example the customer listing procedures 338. Finally, at process block 928, the service provider assigns each selected service provider to the one or more generated service seeker lists, for example as depicted via customer list screen 700, as depicted in FIG. 6.

Figure 19:
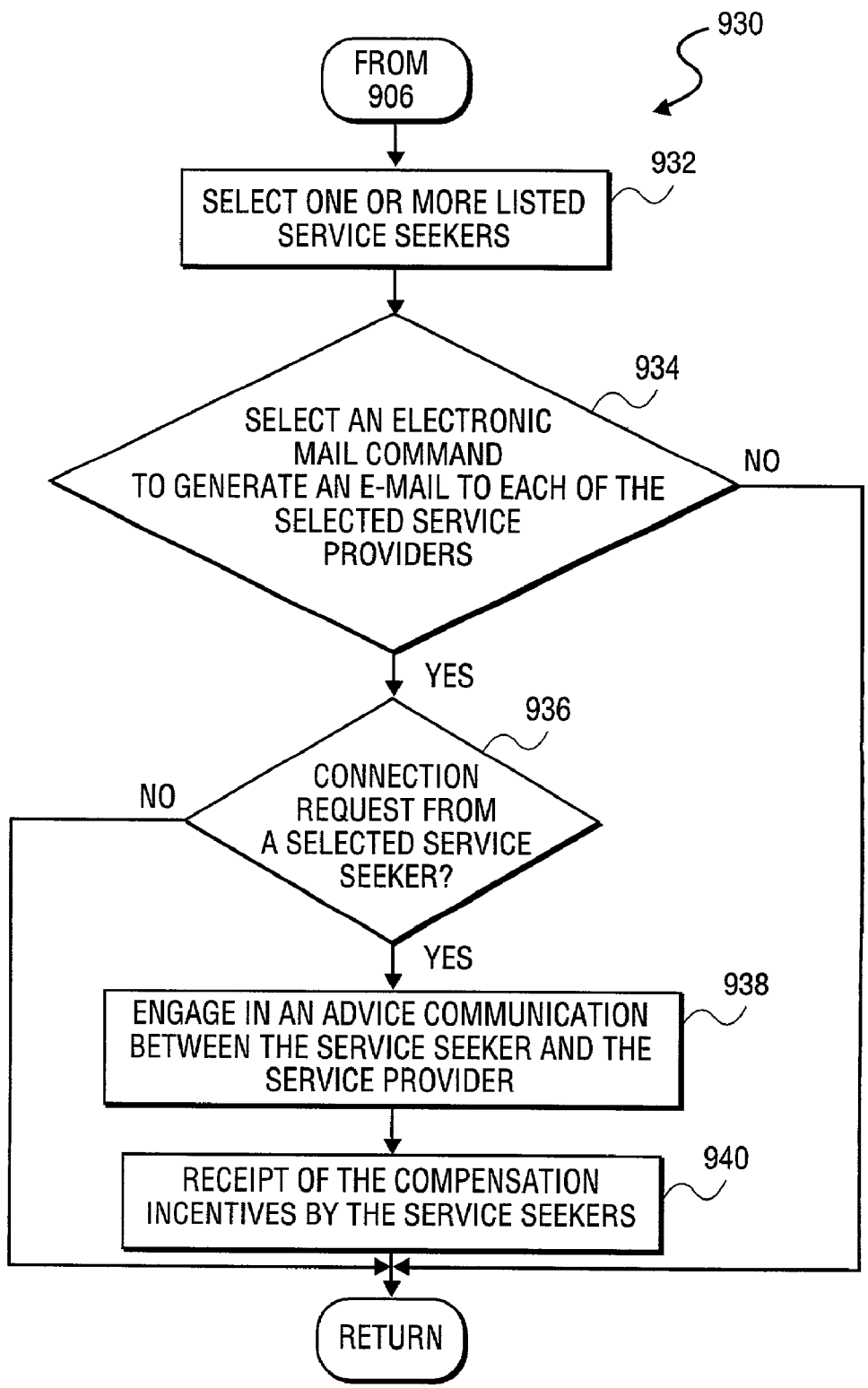
FIG. 19 depicts a flowchart illustrating a method for providing incentive compensation to service providers in accordance with an exemplary embodiment of the present invention.

Referring now to FIG. 19, FIG. 19 depicts a flow chart illustrating a method 930 for providing incentive compensation to service providers. At process block 932, one or more service seekers are selected from the listing 520 of the customer management screen 500. Next, at process block 934, the service provider selects the compose e-mail option 506 to generate an e-mail to each of the selected service providers. In one embodiment, the e-mail may include compensation incentives for receipt of repeat advice communication from the service provider. Next, at process block 938, it is determined whether a connection request is received from one or more of the service seekers receiving the compensation incentives. Once received, at process block 938, the service provider and the service seeker may engage in advice communication. On the advice communication is complete, at process block 940, the service seeker is provided with the compensation incentives, utilizing for example the customer incentive procedures 342.

Figure 20:
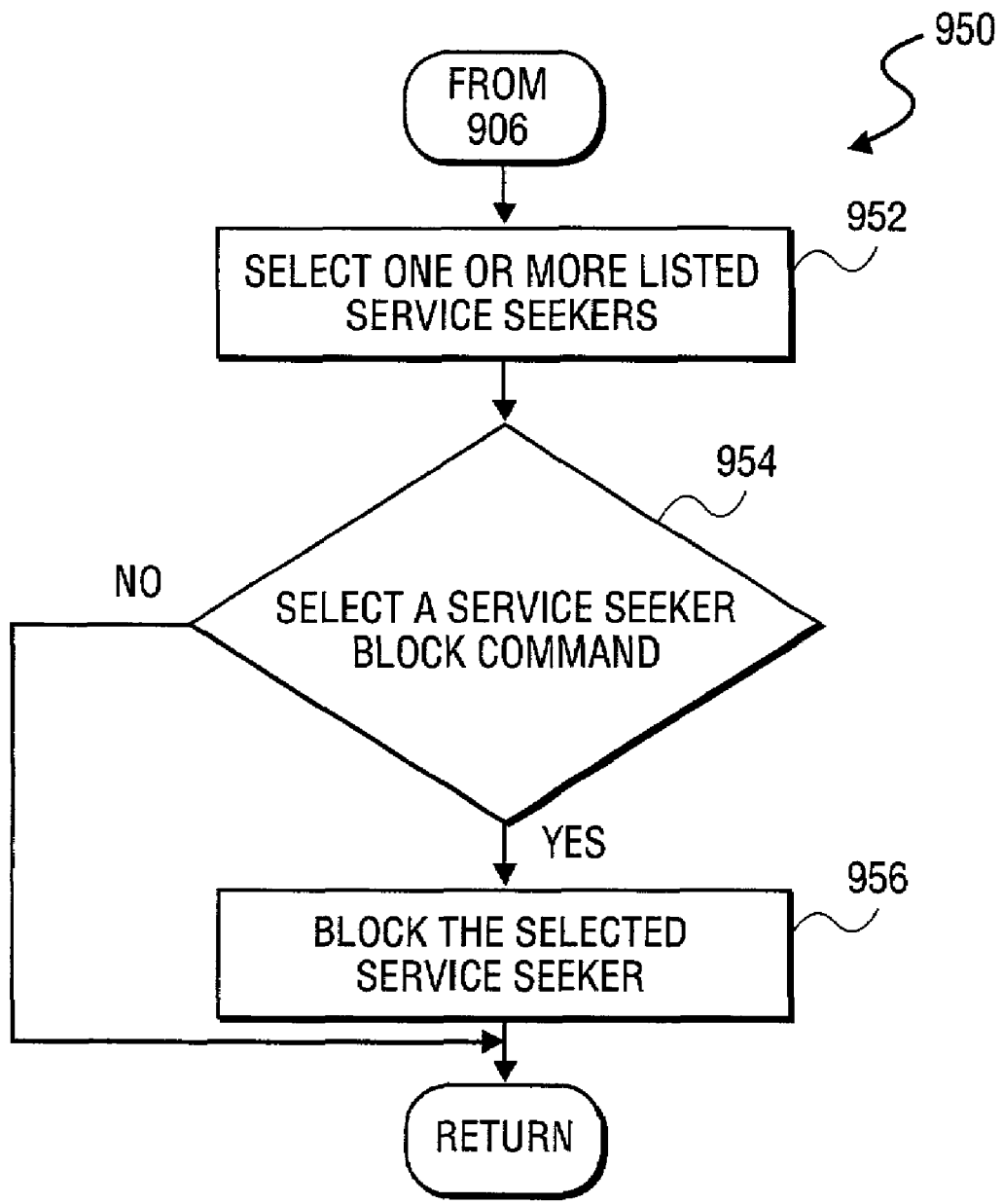
FIG. 20 depicts a flowchart illustrating a method for blocking selected service seekers from receiving repeat live advice communications from a respective service provider in accordance with an exemplary embodiment of the present invention.

Finally, referring to FIG. 20, FIG. 20 depicts a flowchart illustrating a method for blocking service seekers from repeat receipt of advice communications from a respective service provider, utilizing for example the customer blocking procedures 336, as depicted in FIG. 2A. At process block 952, the service provider will select one or more service seekers listed in the customer management screen 500. Next, at process block 954, the service provider will select a service seeker block command. Once selected, at process block 956, the service provider system 100 utilizing the customer block procedures 336 will block the selected service seekers from receiving and engaging in advice communications with the service provider.

Accordingly, as described herein, the customer relationship management procedures enable systems that provide live or recorded advice via communication means, such as e-mail or via online access, with means for tracking the various customers that have solicited and received advice from the various systems. Utilizing these customer tracking options and management functions, the various providers within the systems, as well as the administrator of the systems, may track the various customers and device means for engaging the customers in repeat business. In doing so, the service provider systems will generate increased compensation for themselves and in systems that collect a portion of the fees provided from the service seekers to service providers, additional compensation will be received by the system.

Furthermore, the customer relationship management options may be utilized by service providers in order to provide improved communication advice to service seekers by utilizing such options as customer description procedures 344, as depicted in FIG. 2A, and customer contact screen 630 to make notes regarding each advice communication with a service seeker. Such notes may be utilized in order to better understand the service seekers problems and provide improved advice communication in the future. Accordingly, the quality of service provided by such a system will be improved, resulting in repeat business, as well as additional customers.

Alternate Embodiments

Several aspects of one implementation of the online advice customer relationship management system for providing customer relationship management have been described. However, various implementations of the online advice customer relationship management system provide numerous features including, complementing, supplementing, and/or replacing the features described above. Features can be implemented as part of an online system or as part of a client-server system in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to an online advice customer relationship management system, it will be appreciated by those skilled in the art that the teaching of the present invention can be applied to other systems. In fact, systems for tracking customers who receive online advice via audio transmission mediums are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to enable service providers of service provider systems to track the various customers that have received live advice from the various service providers. In doing so, the service providers may provide incentives to service seekers that have received live advice from the service provider in order to induce repeat business. The service provider can also track service seekers and receive alerts from the system for initiating e-mail contact with service seekers designated by the system as most likely to engage in repeat business. The customer relationship tool described herein enables service providers to track clients in order to generate follow-up business, which will provide increased compensation for the service providers and as a result, provide increased compensation for the service provider system, which collects a portion of the fees charged by the service providers for providing live advice regarding one or more fields of service.

Having disclosed exemplary embodiments and the best mode, modifications and variations may be made to the disclosed embodiments while remaining within the scope of the invention as defined by the following claims.

What is claimed is:

1. A computer-implemented method comprising:
   determining a service provider ID code of a service provider based on a request received from the service provider;
   based on the determined service provider ID code, generating a list of service seekers having received advice from the service provider;
   displaying the list of service seekers;
   receiving a service provider selection for one or more of the listed service seekers and a selected customer management processing command; and
   processing, using a computer, the selected service seekers according to the selected customer management processing command;
   wherein in response to receiving a contact command, providing the service provider a process for contacting the selected service seekers; and in response to receiving a block command, blocking the selected service seekers from receiving further advice from the service provider.

2. The computer-implemented method of claim 1, wherein prior to determining a service provider ID code, the method further comprises:
   receiving a login request from a service provider, including a service provider ID code and a service provider password;
   verifying the service provider password as corresponding to the service provider ID code from the login request;
   once verified, presenting the service provider with a service provider system home page; and
   once the service provider selects a customer-management link, presenting the service provider with a customer-management interface screen.

3. The computer-implemented method of claim 1, wherein prior to determining the service provider ID code, the method further comprises:
   selecting a service provider available from a service provider system;
   determining one or more service seekers having received advice communication regarding a field of service from the selected service provider;
   generating a transaction record within a service seeker transaction database for each determined service seeker; and
   repeating the selecting, determining and generating for each service provider available from the service provider system.

4. The computer-implemented method of claim 1, wherein determining the service provider ID code further comprises:
   receiving a selection from a service provider for a customer-management link;
   once the request is received, detecting a service provider ID code of the service provider; and
   providing the determined service provider ID code to a service seeker list generation procedure.

5. The computer-implemented method of claim 1, wherein generating the list of service seekers further comprises:
   querying a service seeker transaction database to determine the list of service seekers having received advice communication from a service provider matching the service provider ID code, wherein the advice is one of live advice via a communication medium, recorded advice and written advice via electronic mail.

6. The computer-implemented method of claim 1, wherein displaying the list of service seekers further comprises:
   sorting the list of service seekers according to a date of most recent contact with the corresponding service provider;
   providing the service provider with one or more links for selecting customer management processing commands, the customer management processing commands for processing one or more selected service seekers being contained in the listing; and
   when a sort request is received from the service provider, sorting the listing according to criteria provided by the service provider.

7. The computer-implemented method of claim 1, wherein displaying the list of service seekers further comprises:
   identifying one or more of the service seekers which are designated as potential repeat customers according to pre-determined criteria; and
   providing an alert to the service provider for each of the identified service seekers.

8. The computer-implemented method of claim 1, wherein displaying the list of service seekers further comprises:
   listing the service seekers according to a method of receiving advice communication, wherein the method of receiving advice communication includes one of a telephone advice conversation, a recorded advice communication and an e-mail advice communication.

9. A computer readable storage medium including program instructions that direct a computer to perform a method when executed by a processor, the method comprising: determining a service provider ID code of a service provider based on a request received from the service provider; based on the determined service provider ID code, generating a list of service seekers having received advice from the service provider;
   displaying the list of service seekers;
   receiving a service provider selection for one or more of the listed service seekers and a selected customer management processing command; and
   processing the selected service seekers according to the selected customer management processing command;

wherein in response to receiving a contact command, providing the service provider a process for contacting the selected service seekers; and in response to receiving a block command, blocking the selected service seekers from receiving further advice from the service provider.

10. The computer readable storage medium of claim 9, wherein prior to determining a service provider ID code, the method further comprises:
- receiving a login request from a service provider, including a service provider ID code and a service provider password;
- verifying the service provider password as corresponding to the service provider ID code from the login request;
- once verified, presenting the service provider with a service provider system home page; and
- once the service provider selects a customer-management link, presenting the service provider with a customer-management interface screen.

11. The computer readable storage medium of claim 9, wherein prior to determining the service provider ID code, the method further comprises:
- selecting a service provider available from a service provider system;
- determining one or more service seekers having received advice regarding a field of service from the selected service provider;
- generating a transaction record within a service seeker transaction database for each determined service seeker; and
- repeating the selecting, determining and generating for each service provider available from the service provider system.

12. The computer readable storage medium of claim 9, wherein determining the service provider ID code further comprises:
- receiving a selection from a service provider for a customer-management link;
- once the request is received, detecting a service provider ID code of the service provider; and
- providing the determined service provider ID code to a service seeker list generation procedure.

13. The computer readable storage medium of claim 9, wherein generating the list of service seekers further comprises:
- querying a service seeker transaction database to determine the list of service seekers having received advice from a service provider matching the service provider ID code;
- wherein the advice is one of live advice via a communication medium, recorded advice and written advice via electronic mail.

14. The computer readable storage medium of claim 9, wherein displaying the list of service seekers further comprises:
- sorting the list of service seekers according to a date of most recent contact with the corresponding service provider;
- providing the user with one or more links for selecting customer relationship processing commands, the customer relationship processing commands for processing one or more of the service seekers being contained in the listing; and
- when a sort request is received from the service provider, sorting the listing according to criteria provided by the service provider.

15. The computer readable storage medium of claim 9, wherein displaying the list of service seekers further comprises:
- identifying one or more of the service seekers which are designated as desirable customers according to pre-determined criteria; and
- providing an alert to the service provider for each of the identified service seekers.

16. The computer readable storage medium of claim 9, wherein displaying the list of service seekers further comprises:
- listing the service seekers according to a method of receiving advice communication, wherein the method of receiving advice communication includes one of a live telephone advice conversation, a recorded advice communication and an e-mail advice communication.

17. A computer-implemented method comprising:
- accessing, by a service provider, a customer management interface of a service provider system;
- receiving a customer management screen listing one or more service seekers having previously received advice communication from the service provider based on an identity of the service provider; and
- viewing, using a computer, a list of service seekers processed according to one or more customer management processing commands, provided via the customer management screen and selected by the service provider;
- wherein in response to receiving a contact command, providing the service provider a process for contacting the selected service seekers; and in response to receiving a block command, blocking the selected service seekers from receiving further advice from the service provider.

18. The computer-implemented method of claim 17, further comprising:
- selecting one or more listed service seekers;
- selecting a service seeker list assignment command;
- generating one or more service seeker lists; and
- assigning each selected service seeker to the one or more generated service seeker lists.

19. The computer-implemented method of claim 17, wherein viewing the list of service seekers further comprises:
- receiving a service seeker alert for one or more service seekers determined by the system as potential repeat customers according to predetermined criteria; and
- contacting the designated service seekers to provide incentives for repeat engagement in advice communication with the service provider.

20. The computer-implemented method of claim 17, further comprising:
- selecting one or more listed service seekers;
- selecting an electronic mail command to generate an e-mail to each of the selected service providers, including compensation incentives for repeat advice communication between the service provider and one or more service seekers;
- when desired by a service seeker, engaging in an advice communication between the service seeker and the service provider; and
- following completion of the advice communication, receiving, by the service seeker, the compensation incentives.

21. A computer readable storage medium including program instructions that direct a computer to perform a method when executed by a processor, the method comprising:
- accessing, by a service provider, a customer management interface of a service provider system;

receiving a customer management screen listing one or more service seekers having previously received advice communication from the service provider based on an identity of the service provider; and viewing a list of service seekers processed according to one or more customer relationship processing commands, provided via a display screen and selected by the service provider;

wherein in response to receiving a contact command, providing the service provider a process for contacting the selected service seekers; and in response to receiving a block command, blocking the selected service seekers from receiving further advice from the service provider.

22. The computer readable storage medium of claim 21, the method further comprising:

selecting one or more service seekers listed in the service seeker display screen;

selecting a service seeker list assignment command;

generating one or more service seeker lists; and assigning each selected service seeker to the one or more generated service seeker lists.

23. The computer readable storage medium of claim 21, the method further comprising:

receiving a service seeker alert for one or more service seekers determined by the system as potential repeat customers according to predetermined criteria; and contacting the designated service seekers to provide incentives for repeat engagement in advice communication with the service provider.

24. The computer readable storage medium of claim 21, the method further comprising:

selecting one or more service seekers listed in the customer management screen;

selecting an electronic mail command to generate an e-mail to each of the selected service providers, including compensation incentives for repeat advice communication between the service provider and one or more service seekers;

when desired by a service seeker, engaging in an advice communication between the service seeker and the service provider; and following completion of the advice communication, receiving, by the service seeker, the compensation incentives.

25. An online advice customer relationship management system, comprising:

a processor having circuitry to execute instructions;

a customer management interface coupled to the processor, the customer management interface to receive an access request from one or more service providers of the system, and to display one or more customer management screens in response to one or more service providers;

a service seeker transaction database including a transaction record for each service seeker having received advice regarding a field of service from a service provider of the system; and a storage device coupled to the processor, having sequences of instructions stored therein, which when executed by the processor cause the processor to:

determine a service provider ID code;

based on the determined service provider ID code, generate a list of service seekers having received advice from a service provider, and display the list of service seekers;

receive a service provider selection for one or more of the listed service seekers and a selected customer management processing command; and process the selected service seekers according to the selected customer management processing command;

wherein in response to receiving a contact command, the processor provides the service provider a process for contacting the selected service seekers; and in response to receiving a block command, the processor blocks the selected service seekers from receiving further advice from the service provider.

26. The system of claim 25, further comprising:

a service provider database including each service provider available from the system;

a system interface to provide a service seeker with a list of available fields of service, accept a field of service desired by the service seeker, provide the service seeker with a list of one or more service providers stored in the service provider database that match the field of service desired by the user, and receive a selection from the user for a selected service provider; and a communication interface, coupled to the processor, to connect the service seeker with the selected service provider to receive advice communication regarding the selected field of service from the service provider.

27. The system of claim 25, further comprising:

a provider interface for receiving a request from a service provider of a field of service for inclusion in the service provider database, and generating a record in the service provider database, the record including provider information contained in the request.

* * * * *